United States Patent [19]

Poe

[11] Patent Number: 5,719,581

[45] Date of Patent: Feb. 17, 1998

[54] LOW-COST RADIO ALTIMETER

[75] Inventor: John J. Poe, Woodinville, Wash.

[73] Assignee: AlliedSignal, Inc., Morristown, N.J.

[21] Appl. No.: 599,736

[22] Filed: Feb. 12, 1996

[51] Int. Cl.$^6$ .................................................. G01S 13/26
[52] U.S. Cl. .................................... 342/120; 342/122
[58] Field of Search .............................. 342/120, 122, 342/128

[56] References Cited

U.S. PATENT DOCUMENTS

| | | | |
|---|---|---|---|
| 3,934,221 | 1/1976 | Bateman et al. | 342/65 X |
| 3,944,968 | 3/1976 | Bateman et al. | 342/455 X |
| 4,106,017 | 8/1978 | Roeder et al. | 342/88 |
| 4,468,638 | 8/1984 | Kyriakos | 331/178 |
| 4,682,175 | 7/1987 | Lazarus | 342/165 |
| 4,714,928 | 12/1987 | Schmitt | 342/174 |
| 4,739,330 | 4/1988 | Lazarus | 342/122 |
| 4,825,214 | 4/1989 | Dejaegher | 342/128 |
| 4,945,360 | 7/1990 | Trummer et al. | 342/122 |
| 5,495,252 | 2/1996 | Adler | 342/127 |

*Primary Examiner*—John B. Sotomayor

[57] ABSTRACT

A relatively low-cost FMCW radio altimeter includes a voltage-controlled oscillator based upon a GaAs FET. The oscillator produces, for example, a 4.3 GHz microwave signal that is modulated with a triangular wave having a pin-selectable modulation frequency. The modulated signal is amplified by a buffer amplifier, as well as a power amplifier, and connected to an RF output terminal by way of a plurality of microstrips. Reflected signals are received at an RF input and are coupled to a mixer by way of a low-noise amplifier. The modulation signal is also applied to the mixer by way of a microstrip coupling device to produce an audio output signal whose frequency is proportional to the altitude above ground. The gains of all of the amplifiers are selected to eliminate the need for hand-tuning of the microstrips and to enable the use of a glass/epoxy circuit board. The output of the radio altimeter is an audio signal whose frequency is proportional to the height above ground, which enables direct digital conversion by way of a frequency-to-binary converter.

23 Claims, 21 Drawing Sheets

LOW-COST RADIO ALTIMETER

CROSS REFERENCE TO RELATED APPLICATIONS

This case is related to a copending application Ser. No. 08/599,735, filed on even date, entitled "Terrain Warning System" by John Poe, John Snyder Jr., Rory Kestner, Paul Williams, Barry McAnulty and Brian Friedrich, Docket No. 543-95-007 (5806/59142).

BACKGROUND OF THE INVENTION

The present invention relates to a relatively low-cost radio altimeter and more particularly to a FMCW radio altimeter.

Many aircraft operated throughout the world are generally not equipped with a radio altimeter; a device that indicates the height of the aircraft above ground, because of the cost involved. Such radio altimeters are known to enhance the safety of the flight by providing the pilot with vital information relative to the aircraft's position relative to ground. Such aircraft are normally provided with a barometric altimeter, which measures the barometric air pressure and provides a signal relative to the height above sea level. Since the barometric altimeters provide no information relative to the height above ground, pilots must constantly be aware of their geographic location and also the topology of the terrain along the flight path to avoid impact with terrain. Many aircraft accidents have occurred in which the barometric altitude of the aircraft was maintained constant in which the pilot was unaware that the terrain was rising along the flight path. A radio altimeter solves such a problem by providing the pilot of an aircraft with altitude data based upon the height of the aircraft above the terrain. Unfortunately, several barriers exist to equipping the world's aircraft with radio altimeters, including the cost of equipment, the physical size and weight of the equipment, as well as the cost of installing the equipment on an aircraft.

Radio altimeter research dates back to the 1940s. Both pulse-type radio altimeters and frequency-modulated continuous-wave (FMCW) are known. Pulse-type radio altimeters typically measure the actual time required for a transmitted pulse to travel to the ground and return to a receiving antenna on the aircraft. Although such pulse-type radio altimeters provide excellent performance, these radio altimeters are very expensive and often quite large and heavy. As such, FMCW radio altimeters have been developed. Early FMCW radio altimeters used klyston tubes to generate microwave energy. Such klyston tube-based altimeters were relatively expensive, required expensive high-voltage power supplies and required very careful and skillful assembly and alignment. Unfortunately, performance of such klyston tube-based radio altimeters was marginal, while the reliability was relatively poor. However, klystons remained the only practical method to generate microwave energy until the 1970s. In the 1970s semiconductor technology had advanced to a point where microwave energy could be generated using special, extremely high-frequency bipolar transistors. Additionally, the semiconductor technology also produced improved, high-frequency diodes, which allowed the construction of solid-state FMCW radio altimeters. Unfortunately, such solid-state radio altimeters have required the use of relatively expensive, Teflon-based printed circuit board material and polished gold plating on metal surfaces to minimize noise. In addition, the microwave transistors and diodes must be hand tuned, requiring countless hours of skillful and technical alignment. An example of such a radio altimeter is an AlliedSignal KRA10-10A radio altimeter, which includes tuning stubs for proper alignment. Skilled technicians using sharp, small knives are required to carefully scrape the stubs to tune the circuits. Such a process is relatively time consuming and, once tuned, the board is optimized only for the exact microwave transistors and diodes installed. Should the microwave transistor or diodes fail, the entire microstrip transmitter/receiver unit is replaced; and the tuning process is redone. In addition, such Teflon circuit boards are relatively fragile and are relatively easy to damage.

SUMMARY OF THE INVENTION

The present invention solves the problems in the prior art and provides a relatively low-cost FMCW radio altimeter.

According to one aspect of the present invention, the radio altimeter does not require hand-tuning of tuning stubs in the microwave circuit.

According to another aspect of the present invention, to the radio altimeter circuit can be fabricated on a glass/epoxy printed circuit board.

Briefly, the present invention relates to a FMCW radio altimeter that includes a voltage-controlled oscillator based upon a GaAs FET. The oscillator produces, for example, a 4.3 GHz microwave signal that is modulated with a triangular wave having a pin-selectable modulation frequency. The modulated signal is amplified by a buffer amplifier, as well as a power amplifier, and connected to an RF output terminal by way of a plurality of microstrips. Reflected signals are received at an RF input and are coupled to a mixer by way of a low-noise amplifier. The modulation signal is also applied to the mixer by way of a microstrip coupling device to produce an audio output signal whose frequency is proportional to the altitude above ground. The gains of all of the amplifiers are selected to eliminate the need for hand-tuning of the microstrips and to enable the use of a glass/epoxy circuit board. The output of the radio altimeter is an audio signal whose frequency is proportional to the height above ground, which enables direct digital conversion by way of a frequency-to-binary converter.

The radio altimeter of the present invention thus provides the safety benefits of radio altimeter height above terrain information but at a size, cost and weight appropriate for the operation of a greater number of users.

DETAILED DESCRIPTION OF PREFERRED EMBODIMENTS

The radio altimeter of the present invention may be used in a flight safety system of the present invention intended for use in general aviation aircraft operated under Part 91 of the FAA rules and regulations. Although the system is not a ground proximity warning device as defined in TSO C92b, the system can provide alerts of various predetermined flight conditions including warnings and altitude call outs similar to ground proximity warning systems. These predetermined flight conditions may include, for example, unacceptable proximity to terrain, unacceptable closure rate to terrain, improper aircraft configuration, illogical aircraft configuration/airspeed combinations, and altitude alerts. Exemplary audio messages and altitude call outs may be, for example, "CAUTION RISING TERRAIN"; "TERRAIN, TERRAIN"; "TOO LOW FLAPS"; "TWS OK"; "MINIMUMS" and various altitude call outs, e.g., "800"; "500"; "200"; "100" and "50". Accordingly, the flight safety device of the present invention may be optionally referred to as a "terrain warning system" or "TWS". This nomenclature, however, is not intended to define or otherwise limit the type of alerts that may be provided according to the teachings of the present invention.

Figure 1A:
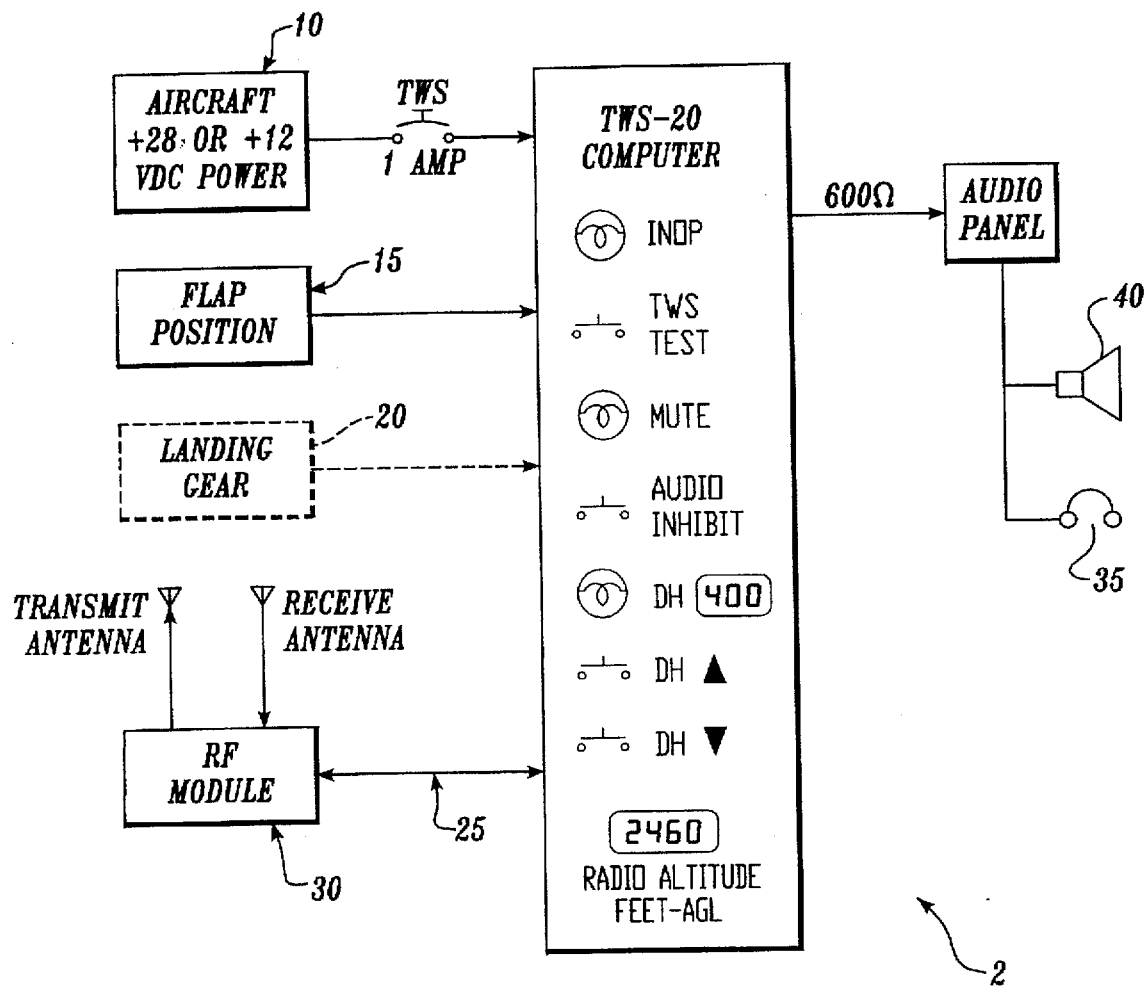
FIG. 1A is a top level, functional block diagram of a flight safety system according to an embodiment of the present invention.

FIG. 1A contains a top level block diagram of a flight safety device 2 constructed according to the present invention. Flight safety device 2 may be powered from the aircraft electrical system 10 and processes inputs 15 and 20 representative of the aircraft's present configuration as well as an input 25 representing the aircraft height above terrain. In the embodiment of FIG. 1A, height above terrain data 25 is supplied by a novel radio altimeter 30 described further below. Device 2 processes inputs 15, 20 and 25 to provide the alerts and warnings of various flight conditions. Alerts may include audible alerts supplied to existing aircraft headphone and speaker systems 35 and 40 or various visual displays. Visual displays may include, for example, decision height and radio altitude.

Figure 1B:
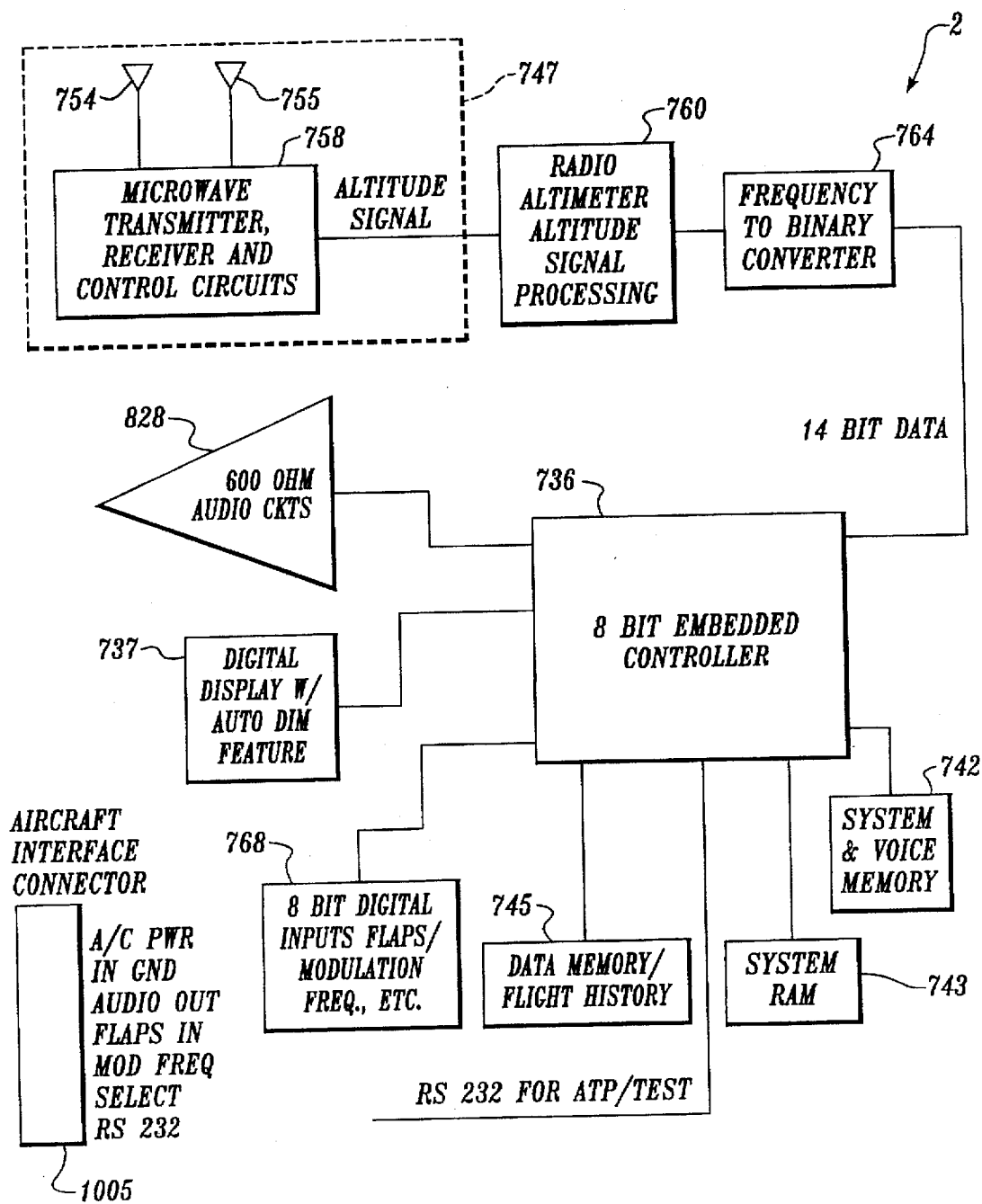
FIG. 1B is a block diagram of a flight safety system constructed according to one embodiment of the present invention.

FIG. 1B contains a block diagram of a flight safety system 2 according to one embodiment of the invention from which the interrelationship of system components may be described. More detailed descriptions of system components are provided below as appropriate.

In the block diagram of FIG. 1B, system 2 operates under the control of an 8 bit embedded controller 736. Embedded controller 736 is a general purpose embedded microprocessor used to process the input signals, generate the various alerts and drive a display 737. According to one embodiment of the present invention, embedded controller 736 is an Intel Model No. 80C188EB. Alternatively, a Intel Model No. KU80C188EC20 processor may be used.

Controller 736 operates in conjunction with several memory devices to generate alerts using aircraft status and warning envelopes stored in a system and voice memory 742. Although other memory types may be used, in a preferred embodiment of the invention, system code/voice memory 742 is a 2 Meg boot-block flash ROM device Intel Model TE28F200BX-T80. System code necessary to operate the device, perform the alert and warning functions and boot-strap code are stored in the memory 742. The digitized voices for audible alerts are also stored in device 742. Provision for updating the code or voices is provided via a RS232 interface. During this process, processor 736 runs out of code stored in the protected boot-block of an additional memory.

A system random access memory 743 is used to store temporary software variables during device operation. Examples of temporary variables include variables that indicate the current position of the flaps or radio altitude value. RAM 743 may be a 1 Meg SRAM.

Also shown in FIG. 1B is a data memory/flight history device 745 in the form of a flash read only memory (ROM). ROM 745 is of the boot-block type and stores code to enable running processor 736 from this block during reprogramming of the system/voice memory in the field using the RS232 connection. When the device of the present invention is installed in an aircraft for the first time, the system must know the specifics of the aircraft configuration. For example, the system must know if the aircraft has flaps, retractable landing gear, the range of flap operation, and other items such as optional features or altitude call-outs.

This configuration data is also stored in ROM 745. Controller 736 also periodically writes flight history information to ROM 745. The structure and operation of the flight history/data memory are described with greater specificity below.

Controller 736 receives as a first input, altitude data indicative of the aircraft height above the terrain. In the embodiment of FIG. 1B, this altitude data is supplied from a radio altimeter shown generally by dashed lines 747. A transmit and a receive antennae 754 and 755 operate to emit and sense radio signals respectively. Optionally, a single antenna may be used. The radio signals are emitted and processed under control of a microwave transmitter/receiver and control circuit 758 to produce the analog altitude signal which is further filtered and processed by signal processor circuitry 760. The design and operation of the radio altimeter are discussed in greater detail below.

The conditioned and filtered analog altitude signal is then converted to binary form by the frequency to binary converter 764 of FIG. 1B. Frequency to binary converter 764 acts as a frequency counter and converts the frequency output of processing block 760 to 14 bit binary data that can be read by the 8 bit embedded controller 736.

Figure 2:
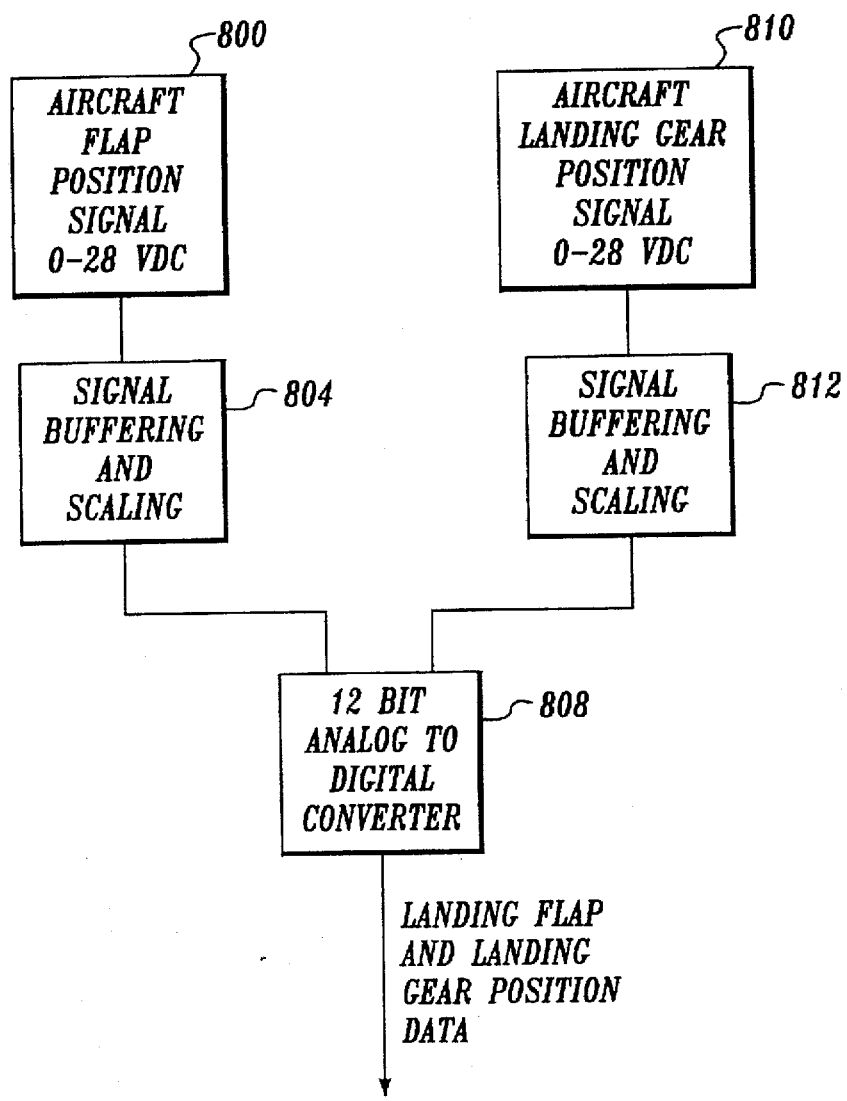
FIG. 2 is a block diagram of a digital input for aircraft configuration information according to an embodiment of the present invention.

Embedded controller 736 also receives as an additional input, 8 bit aircraft configuration information via sensor and modulation block 768. FIG. 2 contains a block diagram of the 8 bit configuration input in greater detail.

Aircraft using the present invention will need to provide electrical signals that clearly differentiate between flap positions from 0 degrees (flaps up) to less than 4 approach flaps (typically 10 degrees) and approach flaps through fully down (typically 10 degrees and greater). These signals can come from discrete devices that are activated by movement of the flaps such as microswitches, Opto-Transistor Switch or from flap position indicators.

The sensor outputs a signal 800 that can be any value from, for example, 0 vdc to 28 vdc, and will vary depending on the position of the flaps (up down, or in landing configuration). This signal is scaled to a D.C. voltage by buffering and scaling circuit 804. Circuit 804 scales the voltage to a value less than the upper input limit of 12 bit analog to digital converter 808 and buffered by means of two operational amplifiers (not shown in FIG. 2). The first operational amplifier scales the input signal voltage down by a factor of 0.143. The second operational amplifier inverts and buffers the scaled voltage.

Circuit 804 supplies the conditioned signal 12 bit analog to digital converter 808 which converts the DC signal to a digital word. The digital word representing the flap position is input to the system microprocessor 736.

The present invention can also include a landing gear sensor for aircraft equipped with retractable gear. The aircraft landing gear signal information is processed in the same manner as the aircraft flap position described above. A gear sensor outputs a DC voltage signal 810 indicative of the gear position. A buffering and scaling circuit 812 scales the voltage and buffers the signal in a manner similar to circuit 804. The buffered signal is then converted to a digital word by analog to digital converter 808 for input to processor 736.

Microprocessor 736 is also coupled to the display 737 and to an audio output 828. Microprocessor 736 uses the configuration and altitude information to generate alerts according to warning modes and procedures to be outlined in detail below. In the preferred embodiment of the invention, at least a portion of these alerts are audible alerts provided through audio circuits 828.

Figure 3:
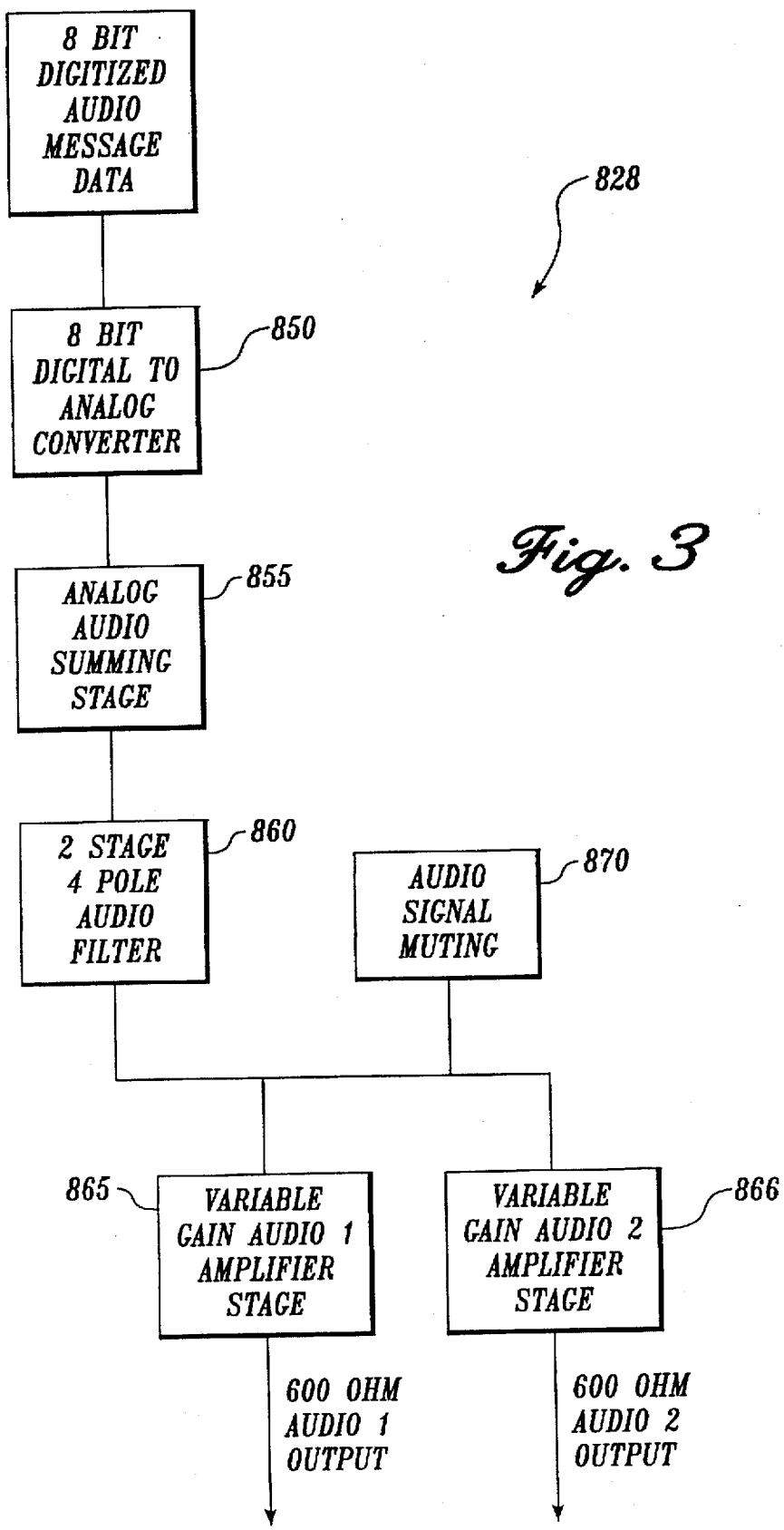
FIG. 3 is a block diagram of an audio circuit according to an embodiment of the present invention.

The digitized audio voice messages, alerts, and warnings are stored in system voice memory 799. Under control of processor 736, these messages are sent when required, over the system data lines in an 8 bit format. FIG. 3 depicts the audio circuit in block diagram form. The 8 bit digital message data are fed to an 8 bit digital to analog converter 850 which is implemented by an "R-2R" resistive network in conjunction with a summing stage amplifier. The summing stage amplifier is shown above as analog audio summing stage 855. Other digital/analog converters known to those skilled in the art may also be used.

After conversion from digital to analog, the voice message data is sent to a 2 stage 4 pole audio filter 860. In one embodiment of the invention, filter 860 has a cutoff frequency of approximately 7 Khz to keep unwanted spurious electronic noise out of the aircraft audio system.

The filtered audio voice signal is then fed to two identical but separate audio amplifiers 865, 866. Each amplifier 865, 866 has a 600 ohm output impedance for matching to standard aircraft audio systems. Amplifier 865, 866 also include variable gain provided by means of a digitally controlled potentiometer installed in the feedback loop of the amplifier. The variable gain of the amplifier enables adjustment of the signal out volume as input to the aircraft audio system.

Inputs to the two amplifier gain stages may also be grounded to disable the audio amplifiers any time that an audio message is not being issued. This feature further assures that spurious electronic signals of a frequency in the audio range will not be introduced into the aircraft audio system. When a voice message is being produced, the input stages to audio amplifiers 865,866 are released from ground, thus enabling the audio system. An audio signal mute circuit 870 may be activated by the pilot using a selector switch found on the system display.

Figure 4:
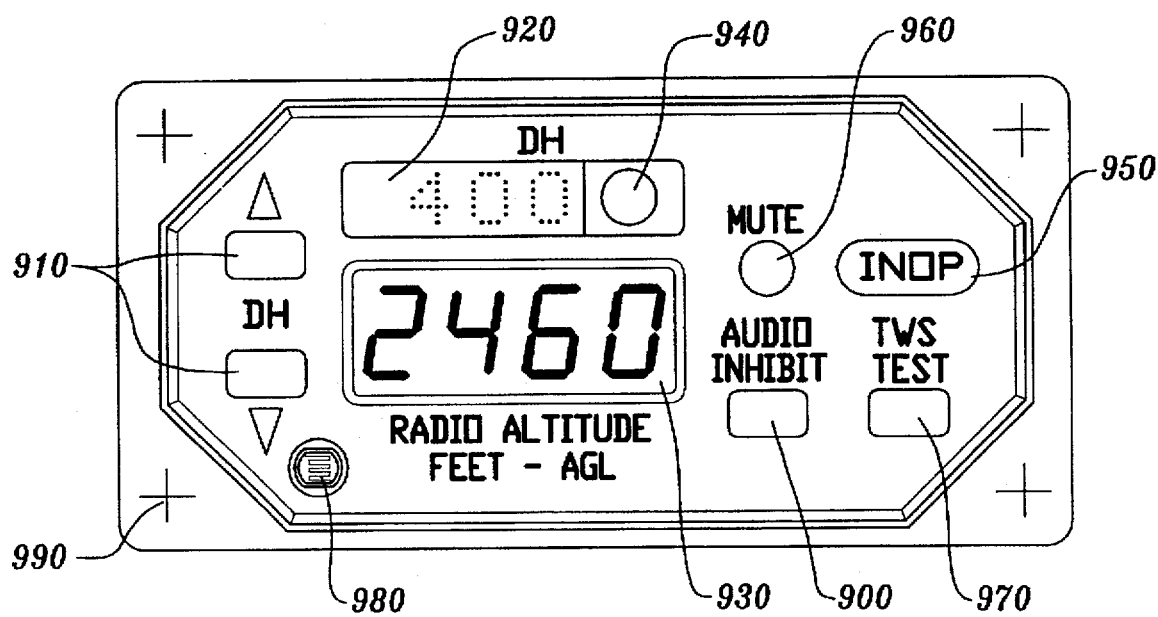
FIG. 4 is a front view of a display according to an embodiment of the present invention.

Microprocessor 736 of FIG. 1B is used to drive display 737 and to process user selectable commands input through display 737. FIG. 4 is a front view of a display drawn to actual size according to one embodiment of the present invention. The audio mute switch described above may be readily seen in FIG. 4 as reference numeral 900. Display 737 of FIG. 4 also includes a mechanism 910 for setting altitude alerts or call-outs. One use of altitude call-outs is to announce decision height when flying under instrument flight rules. In the drawing as shown, the altitude call-out mechanism 910 comprises a set of up and down buttons that vary the decision height as displayed in window 920. Display 737 further includes a four character, seven segment display 930 used for displaying radio altitude or height above terrain to the pilot. Additional functional features of display 737 are as tabulated in Table 1.

TABLE 1

| DISPLAY FUNCTIONS AND ATTRIBUTES | | |
|---|---|---|
| FUNCTION | FUNCTIONAL DESCRIPTION | DISPLAY ATTRIBUTE |
| Radio Altitude | Provides radio altitude height data to the pilot. The least significant digit of the display will always show as a "0". | 4 character, 7 segment Color — Green or Orange Ref. 930 FIG. 4 Filter overlay shall have first surface layer be diffused. |
| Setting Decision Height | Pressing Up or Down switches will change decision height by 50 foot intervals | Push button switches 1 Up & 1 Down Ref. 910 FIG. 4 |
| Decision | Displays set decision height | 4 character, 5 × 7 dot |

TABLE 1-continued

DISPLAY FUNCTIONS AND ATTRIBUTES

| FUNCTION | FUNCTIONAL DESCRIPTION | DISPLAY ATTRIBUTE |
|---|---|---|
| Height | altitude | matrix Ref. 920 FIG. 4 Color — Yellow |
| Decision Height Light | Alerts pilot when decision height set altitude has been reached | Yellow LED Ref. 940 FIG. 4 |
| INOP Light | System Status — Indicates system problem | Hidden Legend Yellow background Black Legend Ref. 950 FIG. 4 |
| Mute Light | Audio Status — Indicates audio messages have been muted. | Green LED Ref. 960 FIG. 4 |
| TWS Test | Pressing switch initiates a Self Test of system | Push Button Switch (Momentary SPST) Ref. 970 FIG. 4 |
| Audio Inhibit | Pressing switch will inhibit all audio messages | Push Button Switch (Momentary SPST) Ref. 900 FIG. 4 |
| Auto Dim | The brightness of both the Radio Altitude and decision height displays will be automatically controlled by a photo sensing element located on the face of the display. At night, the Radio Altitude and decision height displays dim down to 3-4 Foot Lamberts. | Photo Sensor Ref. 980 FIG. 4 |

Functional legends and characters will be "Backlighted" for night vision.

Figure 5A:
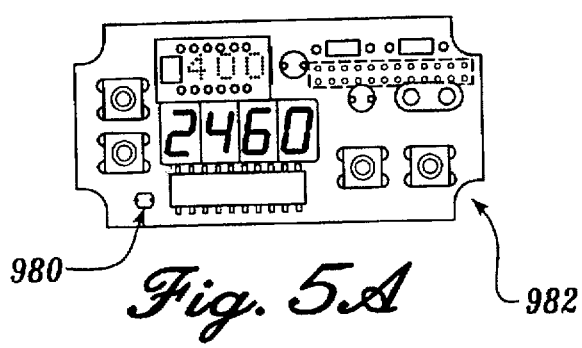
FIG. 5A is a front view of a display circuit card according to an embodiment of the present invention.
Figure 5B:
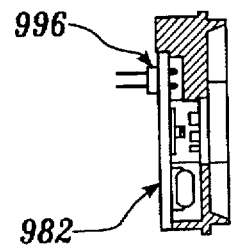
FIG. 5B is a side view of the circuit card of FIG. 5A mounted to a bezel.
Figure 5C:
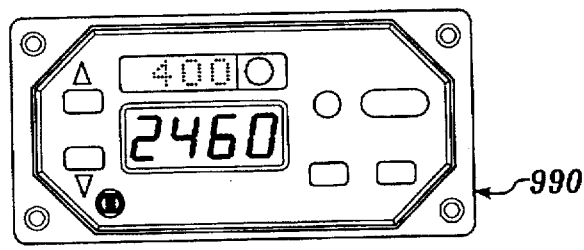
FIG. 5C is a front view of the circuit card of FIG. 5A mounted in a bezel.
Figure 5D:
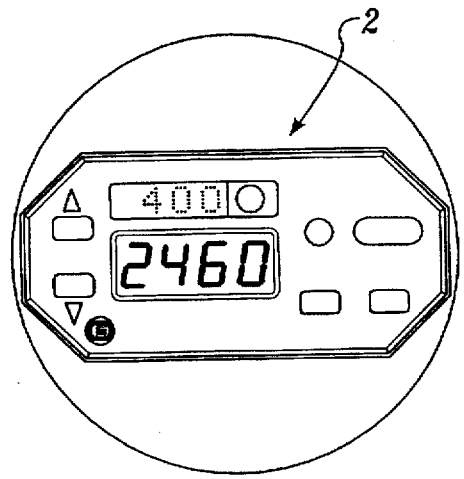
FIG. 5D is a front view of the circuit card of FIG. 5A mounted in a circular assembly according to an alternate embodiment of the present invention.
Figure 5E:
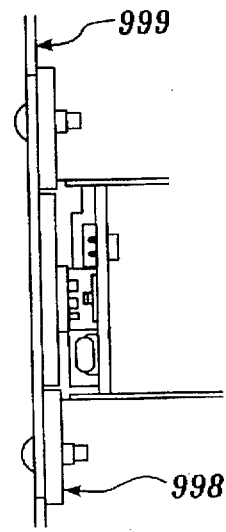
FIG. 5E is a side view of the device of FIG. 5D.
Figure 6A:
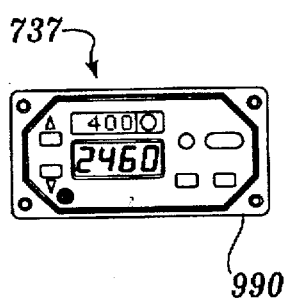
FIGS. 6A–6D are front, top, side and end views of a housing suitable for containing and mounting the present invention.
Figure 6B:
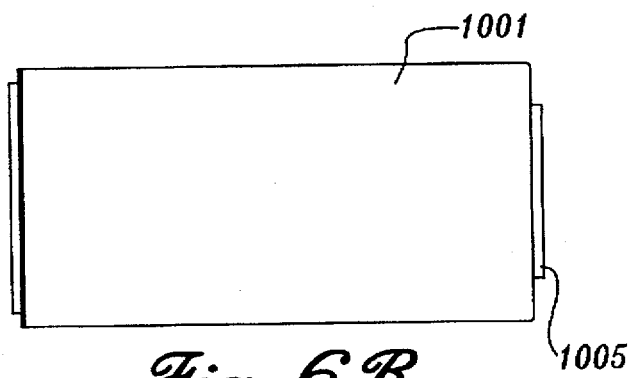
Figure 6C:
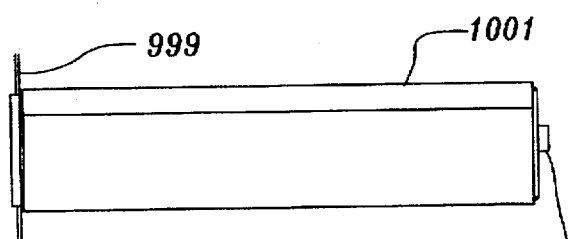
Figure 6D:
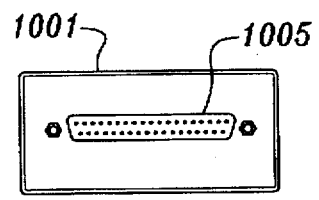

In one embodiment of the invention, the display is sized to a ½ ATI form factor. FIGS. 5A–5E provide additional details of the display construction. FIG. 5A shows a circuit card assembly 982 for containing the functional components of the display. FIGS. 5B and 5C is a side and front view respectively which illustrate how the display circuit card 982 may be mounted in a bezel 990 which contains mounting hardware for securing the present invention within the instrument panel of the aircraft. A 24 pin connector 996, visible in FIG. 5B, connects the circuit card to processor 736 and other device circuitry. FIGS. 5D and 5E show an alternate embodiment of the present invention diagramming how the present invention may be mounted in a standard 3.12 inch diameter instrumentation well. FIG. 5E presents a side view of the mounting hardware and adapter plate 998 for securing the invention to the instrument panel 999.

Display 737 forms the front portion of the device viewed through the instrument panel by the pilot. FIGS. 6A–6D illustrate front, top, side and rear views of the device housing 1001 respectively. As is evident from the dimensions shown on the drawing, the novel electronic and packaging design of the present invention enable the device to fit easily within the confined spaces behind the instrument panel of smaller general aviation aircraft.

Visible in the rear view of housing 1001 is a 37 pin D-Subminiature connector 1005. Connector 1005 provides the electrical interface to the aircraft for the inputs and outputs listed in Table 2.

TABLE 2

AIRCRAFT INTERFACE CONNECTOR INPUTS AND OUTPUTS

| | |
|---|---|
| Input: | Aircraft power, +28 VDC or +14 VDC Aircraft ground Flap Position (Approach) Gear Down (if applicable) |
| | Modulation Frequency select — This pin left unconnected sets the radio altimeter modulation frequency of 100 Hz. Grounding this pin selects the alternate frequency of 102 Hz. This pin should be left unconnected unless the aircraft is using another radio altimeter and a conflict between altimeters has been determined. RS 232 — provides EIA standard RS 232 communications to/from the device via this connector. These RS 232 connections are normally used for aircraft installation for auto-configuration, as well as for automatic test procedures (ATPs). |
| Output: | The device provides two available standard general aviation audio outputs each capable of delivering 50 mW into 600 ohms. |

Connector 1005 is also represented as functional block 1005 of FIG. 1B.

Figure 7A:
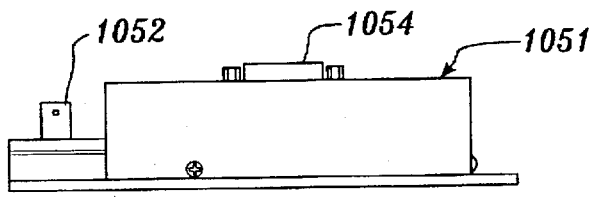
FIGS. 7A–7C are side, plan and end views of a separate RF module according to an embodiment of the present invention.
Figure 7B:
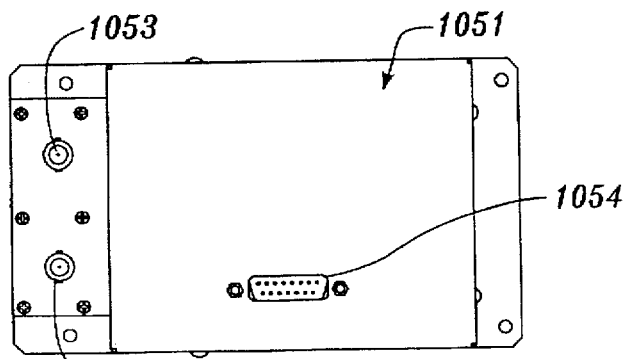
Figure 7C:
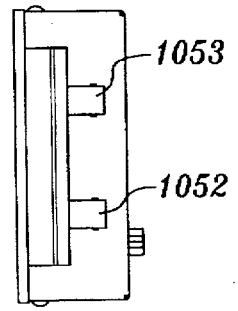

In one embodiment of the present invention radio altimeter circuitry 747 is collocated with the remaining circuitry of FIG. 1B inside housing 1001. In an alternate embodiment of the present invention, the radio altimeter is housed in a separate module 1051 as shown in FIGS. 7A–C. FIG. 7A shows a side view of the radio frequency module, FIG. 7B shows a plan view of the module and FIG. 7C shows the end view. Module 1051 contains connectors 1052 and 1053 for coupling to antennae 1024 and 1025, and a pin connector 1054 for connecting with the remainder of the flight safety device. Module 1051 is typically mounted on the belly of the airplane. Additional details on the construction and operation of the radio altimeter as well as various other system components are given below.

RADIO ALTIMETER

Figure 8:
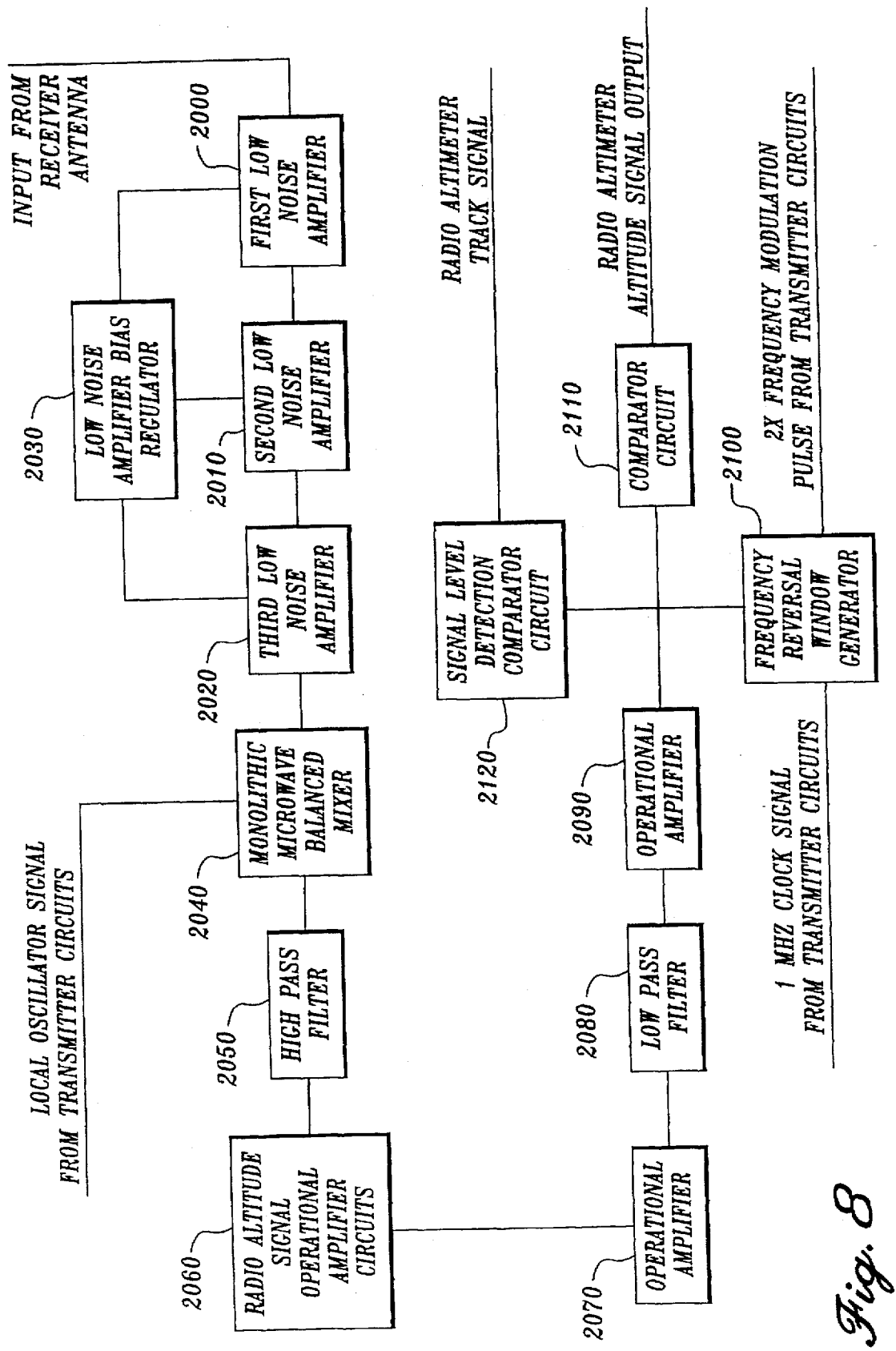
FIG. 8 is a block diagram of a radio altimeter receiver according to one embodiment of the present invention.

The radio altimeter of the present invention includes both receiver and transmitter components. FIG. 8 is a block diagram of the receiver portion of the radio altimeter constructed according to a preferred embodiment of the present invention.

Seen in FIG. 8 is a first low noise amplifier 2000. First low noise amplifier 2000 uses micro strip technology and a single GaAs FET. This amplifier along with all the circuits of the low cost radio altimeter are fabricated on epoxy glass laminate. This material is low cost, and rugged, but has the disadvantages of greater variation in dielectric constant and higher losses than Teflon based laminates. This design compensates for these inherent disadvantages by using GaAs FETs with excellent noise figures, and by using additional stages such that gain and loss variations are compensated for by the added stages. First low noise amplifier 2000 uses resistive elements to load the micro strip circuits, thus lowering their "Q". Lowering the "Q" of the micro strip circuits increases the bandwidth of the circuits therefore making them much more tolerant of laminate variations and FET parameter variations. This design approach in turn allows the design of microwave circuits which do not require individual tuning of each stage. The broader bandwidth, higher loss laminate, wider variation in dielectric constant, and lower "Q" will require additional stages to compensate for the reduced gain of each stage. The very small cost of the additional GaAs microwave FETs is more than compensated for by the cost saved on Teflon laminate and labor to adjust and tune the microwave circuits. This amplifier stage includes micro strip bandpass filters to eliminate unwanted out of band signals. Further advantages of this design approach are discussed in the description of the radio altimeter transmitter.

The output of amplifier 2000 is input to a second low noise amplifier 2010, similar in construction to first low noise amplifier 2000. This stage uses a single GaAs FET as its active element. As with first low noise amplifier 2000, this stage uses micro strip circuits, but does not include micro strip bandpass filters. Resistive loading is used to control the "Q" of this amplifier stage.

A third low noise amplifier 2020 receives the output of second amplifier 2010. Third low noise amplifier 2020 is quite similar to second low noise amplifier 2010. Stage 2020 also uses a single GaAs FET as its active element. As mentioned in connection with the design of reference 2000, the inclusion of these required additional stages provide an additional benefit. Each active stage contributes to improving isolation from signals such as the local oscillator signal. This isolation improvement is important to the performance of the altimeter. Leakage signals from the local oscillator propagate out the receiver output where they are reflected by any mismatch at the antenna or transmission line. These reflected signals return through the receiver. Because of the physical distance they traveled going and coming from the transmission line, these signals appear to the balanced mixer at a frequency slightly different then the present frequency of the local oscillator. This signal would therefore produce a difference signal which would actually be a measure of the transmission line and its associated propagation delay; instead of an actual measurement of height above terrain. Prior radio altimeter designs often made use of Iso-Circulators in an attempt to minimize this leakage. Iso-Circulators add cost to the unit and normally don't work well over large ranges of temperature. This low cost radio altimeter does not need Iso-Circulators.

Coupled to each of the low noise amplifiers is a bias regulator 2030. Low noise amplifier bias regulator 2030 provides a stable voltage source for each of the three GaAs FET amplifiers used in the receiver of the low cost radio altimeter of the present invention.

A monolithic microwave integrated circuit (MMIC) 2040 mixes the local oscillator signal with the amplified received signal and produces an output whose frequency is the difference between these signals. For the low cost radio altimeter, a 40 HZ signal at the output of this MMIC represents a height of 1 foot above the ground. Likewise an aircraft using this device at 2000 feet above the ground would expect to see a frequency of 80,000 HZ at the output of the balanced mixer.

A high pass filter 2050 using resistors and capacitors is provided to help eliminate the effects of any radio altitude signals caused by leakage of the microwave signals. In one embodiment of the present invention, the altimeter uses double shielded coaxial cables; each three feet in length; to feed the antennas. Any real altitude signal will have had to travel out the 3 foot transmit cable, been reflected by the ground, and then return through the 3 foot long receiver cable. The microwave signal travels approximately 1.5 times slower through the cables then it does through free space. Because of this, any radio altitude signal with a frequency less than approximately 360 HZ will have been caused by leakage, rather then by reflection of the signal from the ground. High pass filter 2050 significantly attenuates frequencies below 400 HZ, while offering minimum attenuation to frequencies above this point.

Three low noise operational amplifiers 2060 are used to amplify the very low level radio altitude signal coming from balanced mixer 2040. Amplifiers 2060 are contained within the metal shielding which houses the microwave circuits and supply an output to an operational amplifier 2070.

Operational amplifier 2070 receives the signal coming from the microwave assembly and acts as a buffer for the incoming signal. Amplifier 2070 also is used as an output driver for a low pass filter 2080.

Low pass filter 2080 is implemented with resistors and capacitors and provides significant attenuation to frequencies above 160 KHZ. Some frequency components at and above 160 KHZ could be actual radio altitude signals indicating altitudes at or above 4000 feet. As the actual altitude of the aircraft increases, the signal strength of the reflected signal decreases, and it becomes much more likely that signals at or above this frequency will be the result of noise, rather than real signal. Attenuating signals at and above this frequency helps insure that the altimeter will correctly indicate an out of track condition while flying at higher altitudes above the ground.

The output of low pass filter 2080 is supplied to operational amplifier 2090. Operational amplifier 2090 receives the signal coming from low pass filter 2080 and acts as a buffer. Additionally, amplifier 2090 is used as an output driver for comparator circuits 2110. Comparator circuit 2110 uses an analog comparator to convert the analog radio altitude signal into a level suitable for digital logic circuits.

Frequency Modulated Continuous Wave (FMCW) radio altimeters use triangular modulation wave forms to help eliminate Doppler shift and its associated inaccuracies. While this method solves one problem, it creates yet another. At each point where the frequency sweep direction changes, an ambiguity exists. The difference signal will decrease to zero frequency as the transmitter frequency changes direction. The time duration of this accuracy corruption is fairly short and is a function of how high above the terrain the aircraft is flying. A frequency reversal window generator circuit 2100 uses digital logic circuits and signals from the transmitter's modulation generation circuits to generate a pulse or window starting at the instant when the modulation frequency changes direction. This signal is approximately 1.024 milli seconds in duration and drives the base of a NPN transistor. This NPN transistor is used to short the radio altitude signal to ground for 1.024 milli seconds after the modulation signal changes direction. During this window when the altitude signal will be inaccurate, the altimeter is prevented from processing the received signals.

A signal level detection comparator circuit 2120 converts the radio altitude signal transitions into an equivalent DC voltage, to provide an indication that the signal strength is adequate to provide correct radio altitude information to the pilot.

Figure 9:
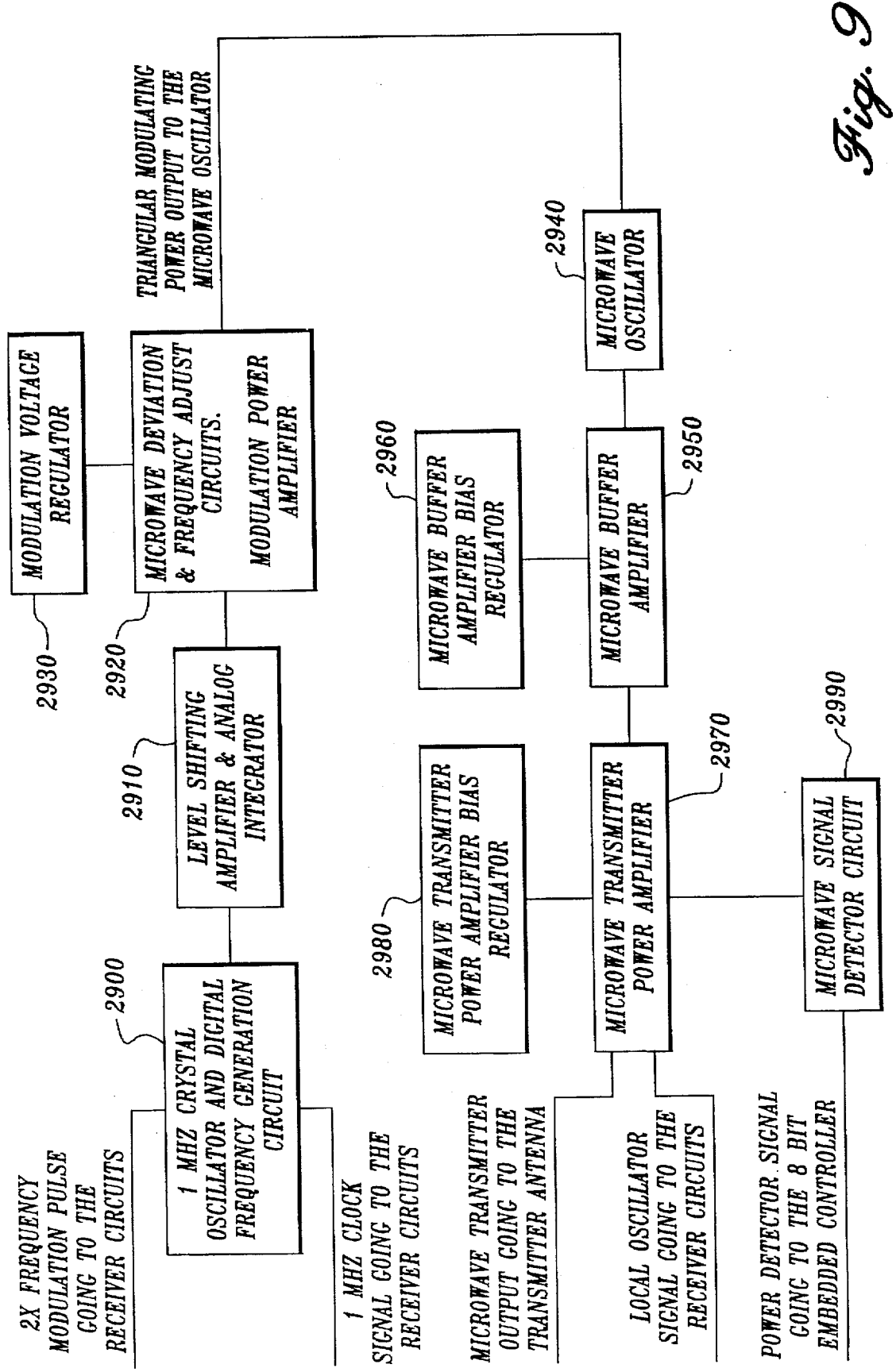
FIG. 9 is a block diagram of a radio altimeter transmitter according to an embodiment of the present invention.
Figure 10A:
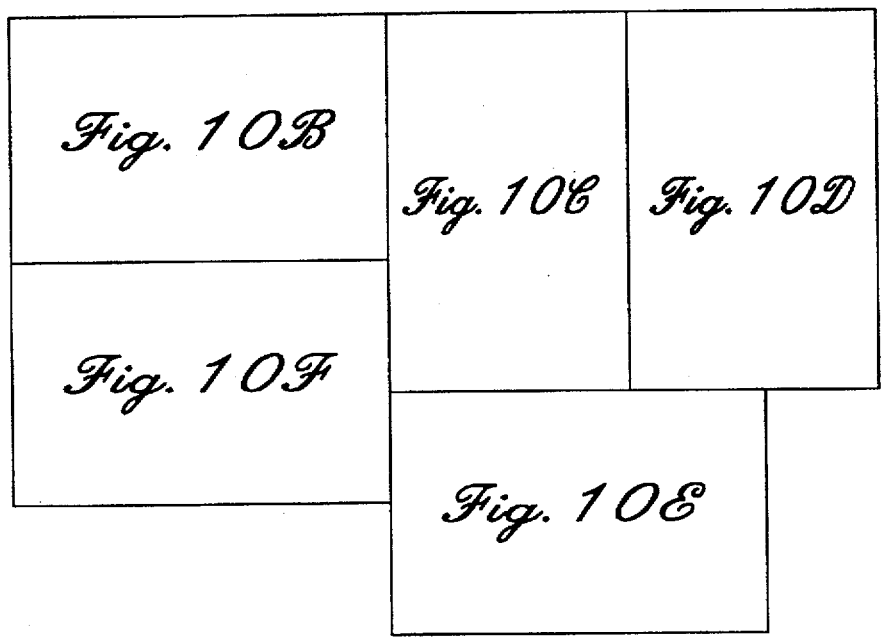
FIG. 10A is a small scale view showing the whole formed by partial views, FIGS. 10B through 10F, and indicating the positions of the parts shown to form an illustrative schematic of microstrip technology utilized in an embodiment of the present invention.
Figure 10B:
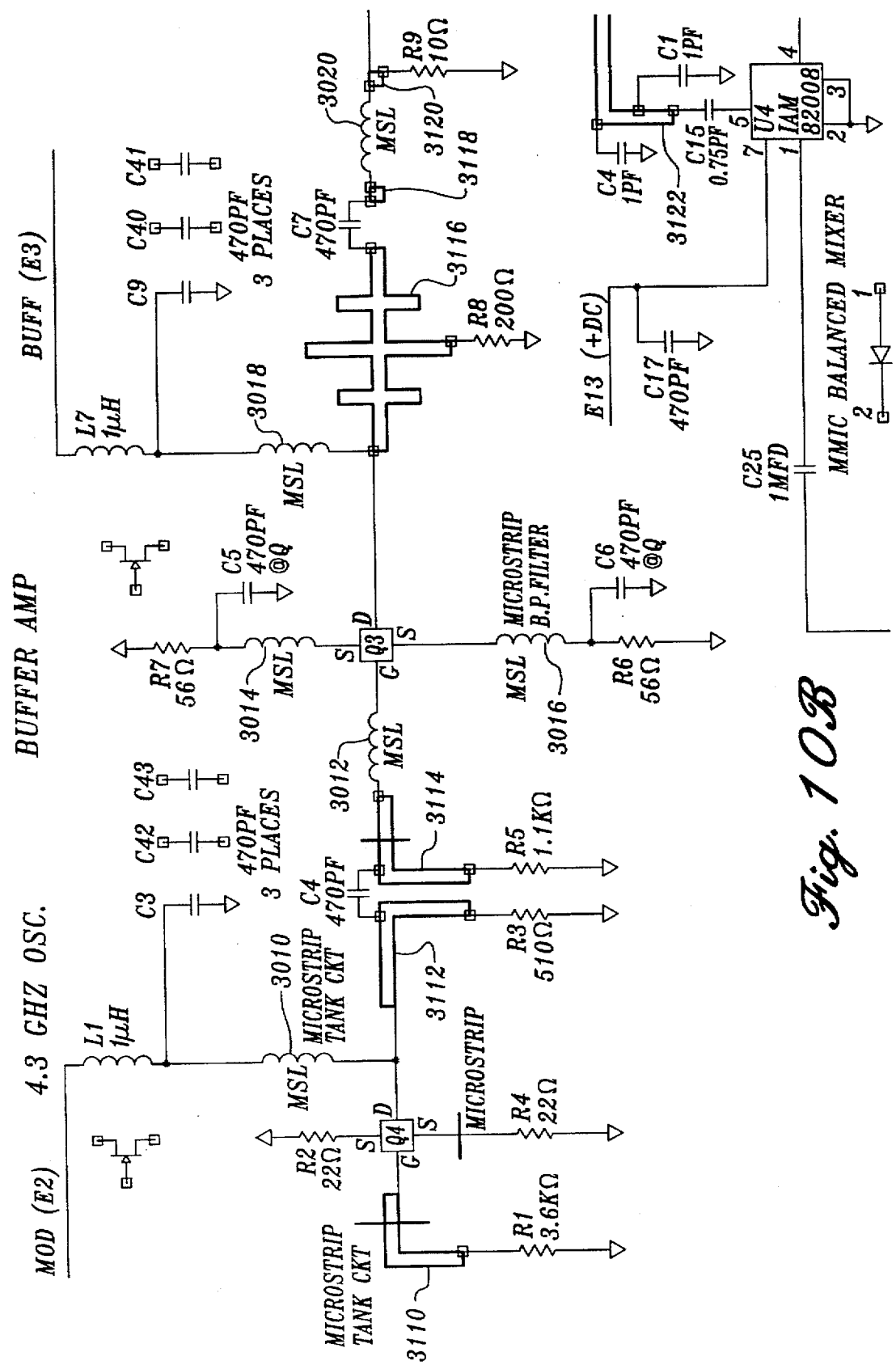
FIG. 10B is a partial view illustrative of a schematic of microstrip technology utilized in an embodiment of the present invention.
Figure 10C:
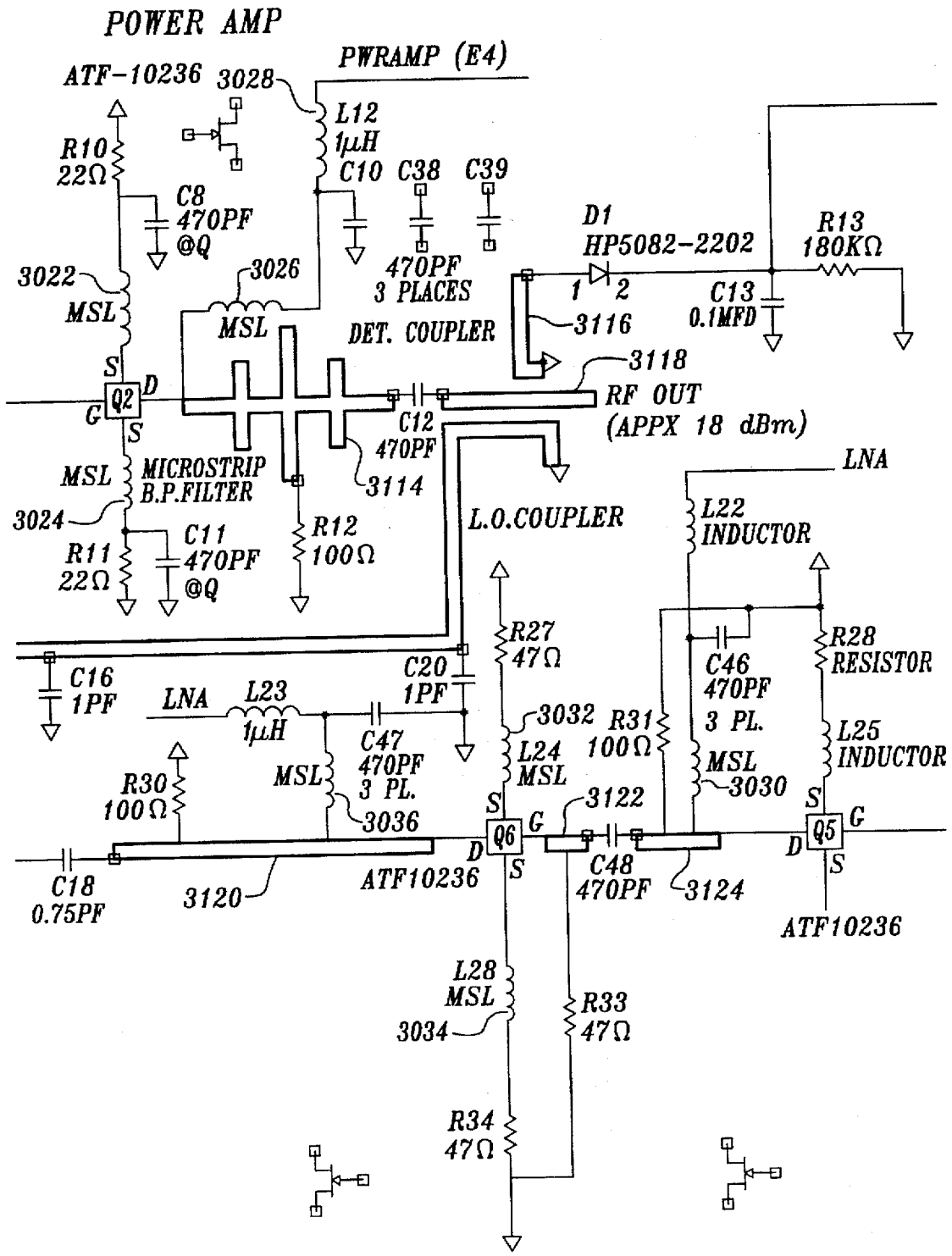
FIG. 10C is a partial view illustrative of a schematic of microstrip technology utilized in an embodiment of the present invention.
Figure 10D:
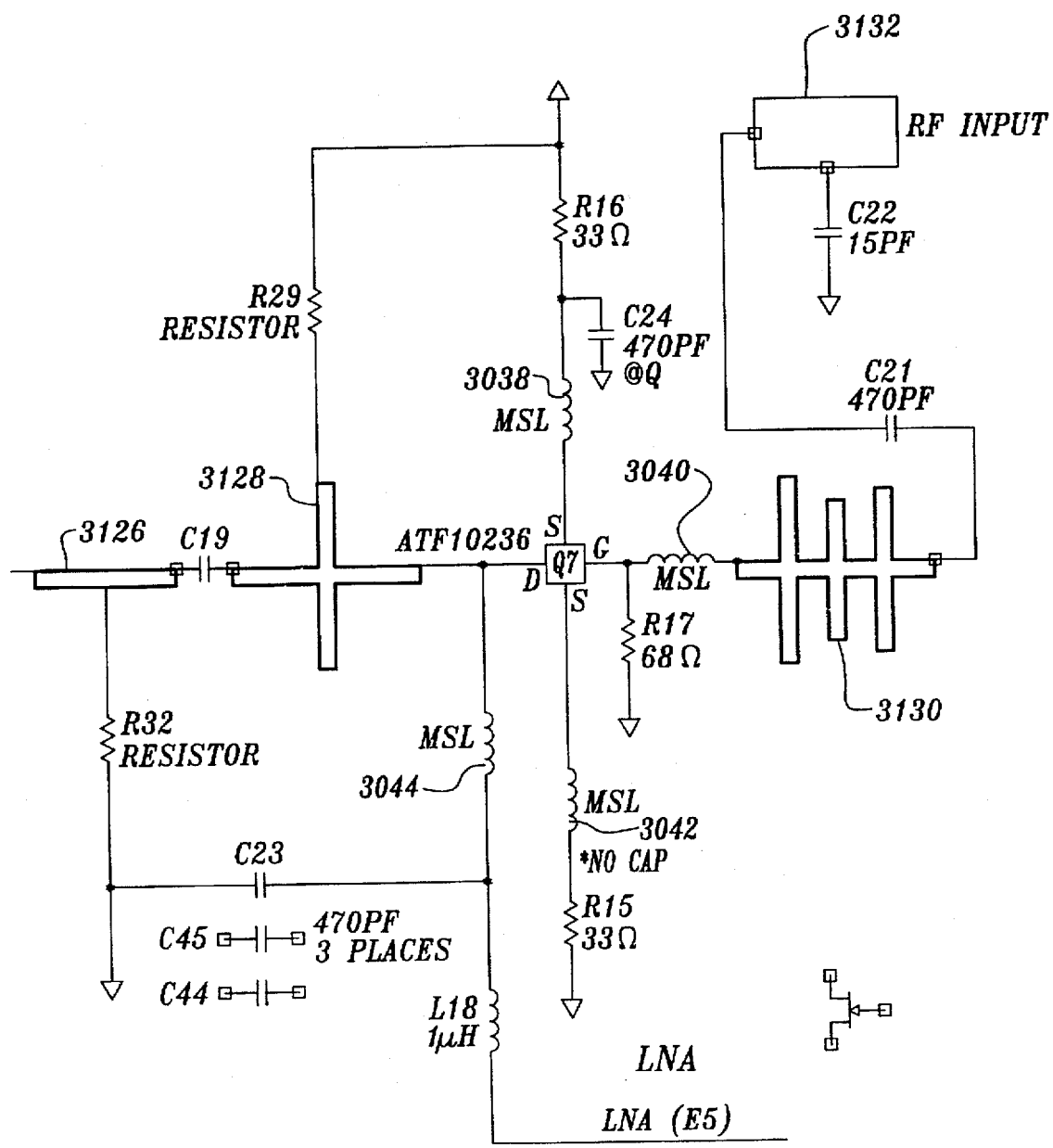
FIG. 10D is a partial view illustrative of a schematic of microstrip technology utilized in an embodiment of the present invention.
Figure 10E:
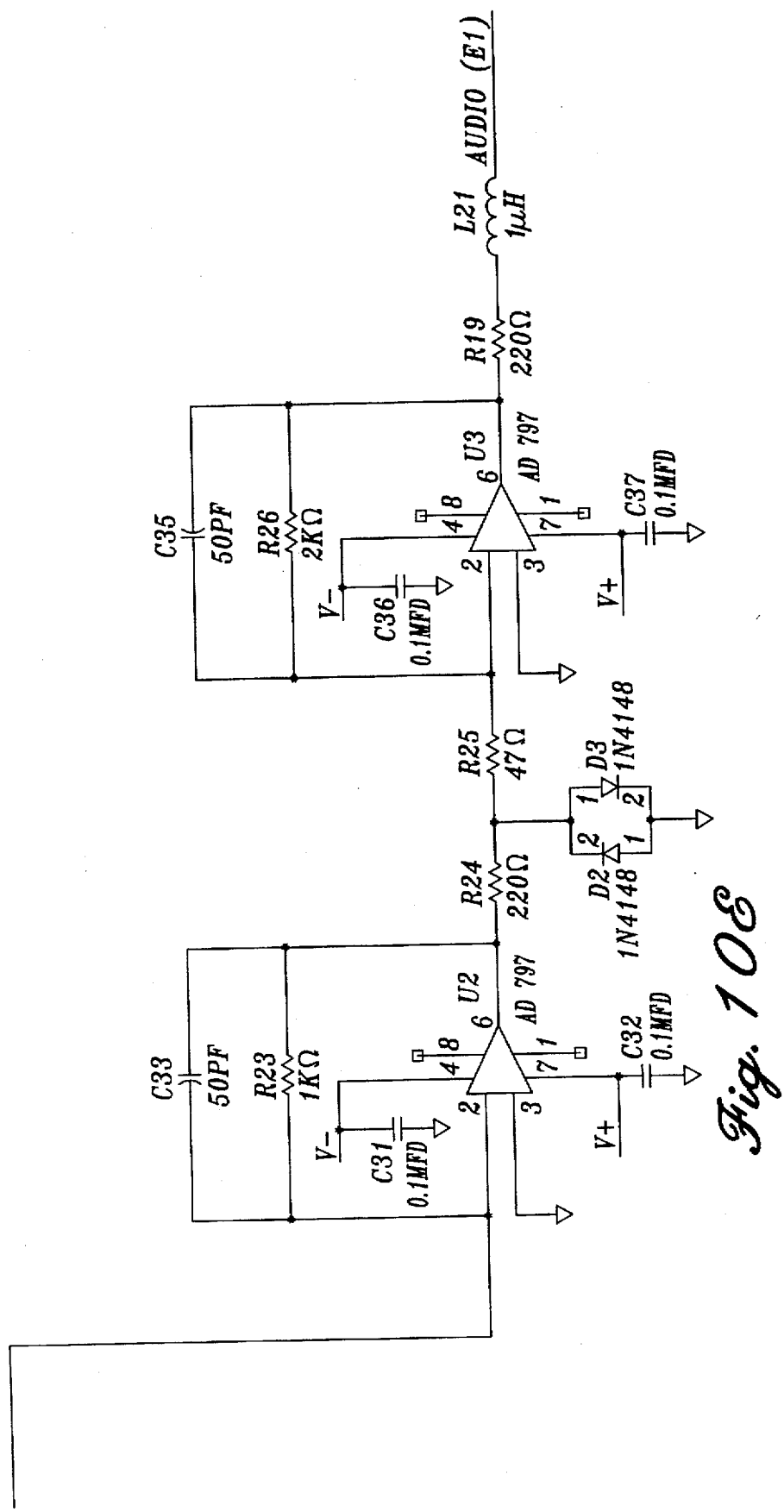
FIG. 10E is a partial view illustrative of a schematic of microstrip technology utilized in an embodiment of the present invention.
Figure 10F:
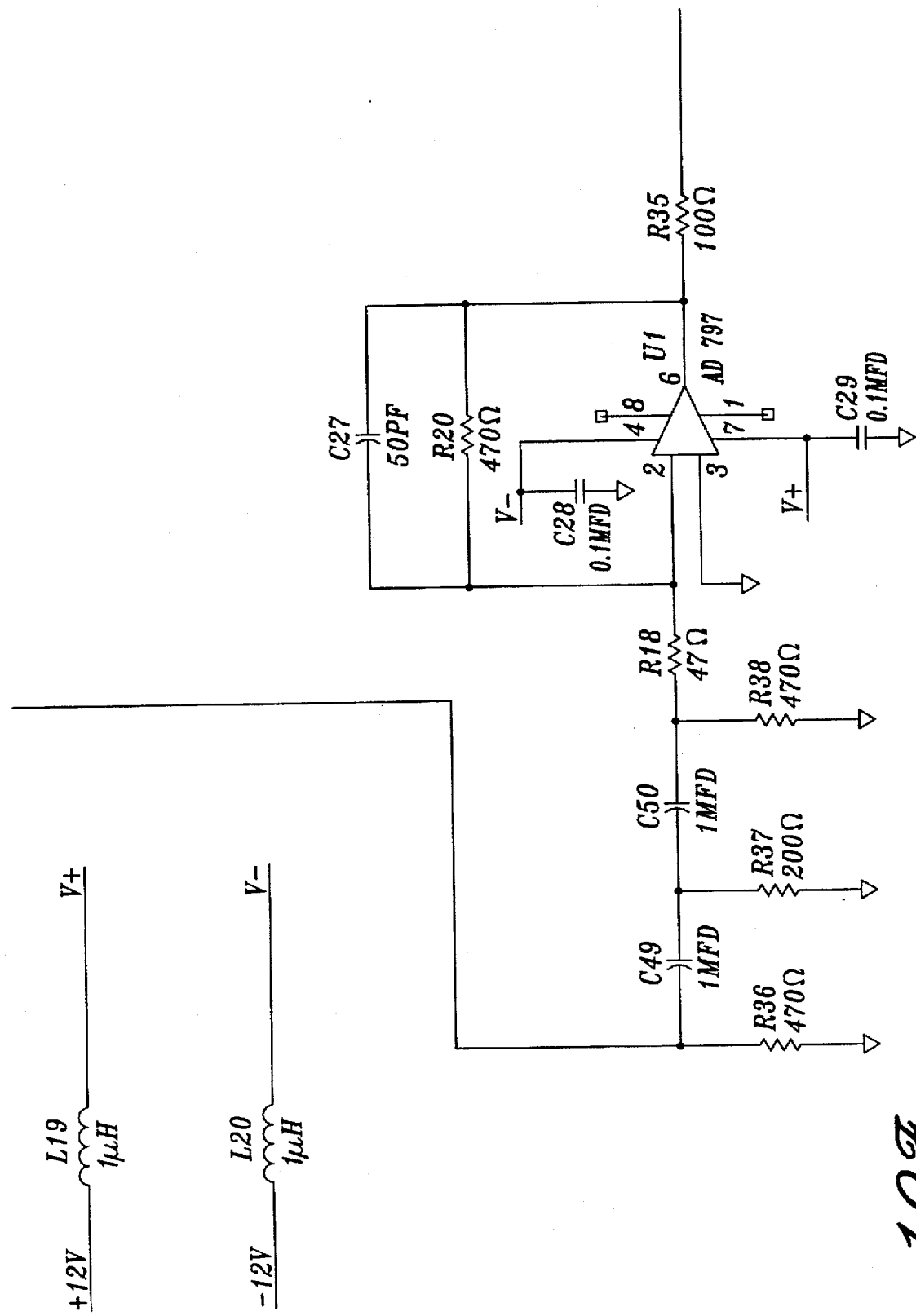
FIG. 10F is a partial view illustrative of a schematic of microstrip technology utilized in an embodiment of the present invention.

FIG. 9 contains a block diagram of the transmitter portion of the radio altimeter.

Reference 2900 is a 1 MHZ crystal oscillator and digital frequency generation circuit which includes 1 MHZ crystal oscillator, binary counters, and digital logic circuits; constructed to generate precise timing signals needed for the low cost radio altimeter. This digital logic circuit forms a state machine which produces the following signals:

(a) Precisely symmetrical square wave at the modulation frequency (either 100 Hz or 102 HZ as selected by a signal line available on the RF module's interface connector);

(b) A two times the modulation frequency short duration pulse used by the receiver circuits to eliminate the ambiguity caused when the modulation direction is reversed. (see Frequency reversal window generator in the receiver description); and (c) 1 MHZ clock provided to the receiver circuits for the Frequency reversal window generator.

A Level shifting amplifier and analog integrator 2910 receives as its input, the precisely symmetrical square wave from reference 2900 above. Since this square wave is generated from digital logic circuits, its amplitude is subject to the tolerance normally allowed for in digital logic circuits. This variation in amplitude from unit to unit could ultimately cause transmitters to be either under or over deviated in frequency. A lack of precision in modulating the transmitter results in significant inaccuracies in the altimeter's altitude readout. This invention minimizes modulation errors by generating a precisely symmetrical square wave from a stable crystal oscillator reference, and by precisely controlling the amplitude of the modulation signal as described below. The precisely symmetrical square wave is AC coupled (to eliminate any DC offsets from the digital circuits) to an operational amplifier which has its gain set such that the output of the amplifier will be driven to saturation on both the positive and negative swings of the input signal. Since the operational amplifier is powered from regulated plus and minus supplies, the resulting saturated square wave is also referenced to the regulated supplies.

Upon leaving level shifting amplifier 2910, this saturated square wave now has precision symmetry and frequency and additionally is now tightly controlled in amplitude. This signal is now applied to an analog integrator which has an integration period much longer than the applied signal. The output of this integrator is a triangular wave form which will be used to modulate the microwave transmitter. Since the integration period is much longer than the applied signal, normal variations in the value of the integration capacitor will not affect the linearity of the output. Variations in the value of capacitors are usually associated with changes in ambient temperature and long term aging of the component.

Microwave deviation and frequency adjust circuits, with Modulation power amplifier 2920 receives triangular wave form described in reference 2910 above. Triangular wave form output from 2910, is applied to a variable resistor which allows the amplitude of the triangular wave form to be adjusted on each individual RF module. This simple adjustment is used to set the frequency deviation for the transmitter. The adjustable amplitude triangular wave form is then applied to an operational amplifier which has a variable resistor used to set the DC offset of the amplifier. The DC offset is used to set the center frequency of the microwave oscillator. A bipolar NPN transistor is used in conjunction with an operational amplifier to provide adequate power to drive the microwave oscillator.

As noted in reference 2920, amplitude of the modulating signal sets the microwave transmitter's frequency deviation, and the DC level of the modulating signal sets the microwave transmitter's center frequency. It is essential that these voltages and amplitudes remain unchanged over time and temperature, after initial calibration. For this reason, a separate voltage regulator 2930 is used to insure stable voltages for the generation of the modulation signal.

The triangular modulating power output is then supplied to a microwave oscillator 2940. Microwave oscillator 2940 uses a single GaAs FET. Oscillator 2940 produces approximately +10 dBM (10 milliwatts) of power at 4.25 GHZ. to 4.35 GHZ. The oscillator is voltage controlled which allows it to be frequency modulated.

The oscillator design uses micro strip technology and includes resistive loading of micro strip elements to lower the "Q" of the circuits. This approach allows the use of epoxy glass laminate as the substrate for the circuits. Lowering the "Q" of the micro strip circuits increases the bandwidth of the circuits therefore making them much more tolerant of laminate variations and FET parameter variations. This novel approach limits the available gain or power which could be realized from the circuits and devices. The minor disadvantage is that more stages will be required to implement a radio altimeter system. Advantages of this design approach include at least the following:

(a) Fabricated on inexpensive epoxy glass laminate;
(b) Very tolerant of normal material variations;
(c) Elimination of tedious fine tuning;
(d) Allows for the simple replacement of a failed microwave device; and
(e) Consistant performance unit to unit. Ease of Manufacturing.

A microwave buffer amplifier 2950 uses a single GaAs FET. Amplifier 2950 provides isolation for microwave oscillator 2940 and additional gain for the transmitter system. Additionally, amplifier 2940 makes use of a micro strip band pass filter in its output circuit to help ensure that the final transmitted signal will be compliant with FCC rules and regulations. The microwave buffer amplifier design uses micro strip technology and includes resistive loading of micro strip elements to lower the "Q" of the circuits. This amplifier is over driven by microwave oscillator 2940. This excessive drive allows the circuit to be extremely tolerant of laminate variations and device variations, as described in reference 2940 above.

The operating point for microwave buffer amplifier 2950 is set by the voltage output of a microwave buffer amplifier bias regulator 2960. This is an adjustable output type regulator which provides a stable, isolated and regulated voltage for buffer amplifier 2950.

Microwave transmitter power amplifier 2970 also uses a single GaAs FET. Amplifier 2970 makes use of a micro strip band pass filter in its output circuit to help ensure that the final transmitted signal will be compliant with FCC rules and regulations. The microwave transmitter power amplifier design uses micro strip technology and includes resistive loading of micro strip elements to lower the "Q" of the circuits. This amplifier is also over driven by the microwave buffer amplifier 2950. This excessive drive allows the circuit to be extremely tolerant of laminate variations and device variations, as described in reference 2940 above. The microwave transmitter power amplifier's output is typically +18 dBm into 50 ohms at frequencies between 4.25 and 4.35 GHZ. A small amount of the microwave transmitter's energy is coupled from the output via a micro strip coupler to be used as a local oscillator signal in the receiver.

The operating point for microwave transmitter power amplifier 2970 is set by the voltage output of the microwave transmitter power amplifier bias regulator 2980. This is an adjustable output type regulator which provides a stable, isolated and regulated voltage for microwave transmitter power amplifier 2970.

A microwave signal detector circuit 2990 comprised of a micro strip coupler from the microwave transmitter power amplifier's output and a microwave detector diode. If the transmitter is producing sufficient power, energy coupled by the micro strip coupler will be rectified by the microwave detector diode. The resultant low level DC voltage is used as an indication that the transmitter is functioning.

FIGS. 10A through 10F are illustrative of a schematic of microstrip technology utilized in an embodiment of the present invention. Inductors 3010, 3012, 3014, 3016, 3018, 3020, 3022, 3024, 3026, 3028, 3030, 3032, 3034, 3036, 3038, 3040, 3042, and 3044 are microstrip inductors. Circuits 3110, 3112, 3114, 3116, 3118, 3120, 3122, 3124, 3126,

3128, 3130, and 3132 are microstrip circuits. Printed wiring board material is 0.032 inch FR4 (epoxy glass laminate). All resistors and physical capacitors are surface mount devices.

SOFTWARE CONTROL AND DEVICE OPERATION

Figure 11:
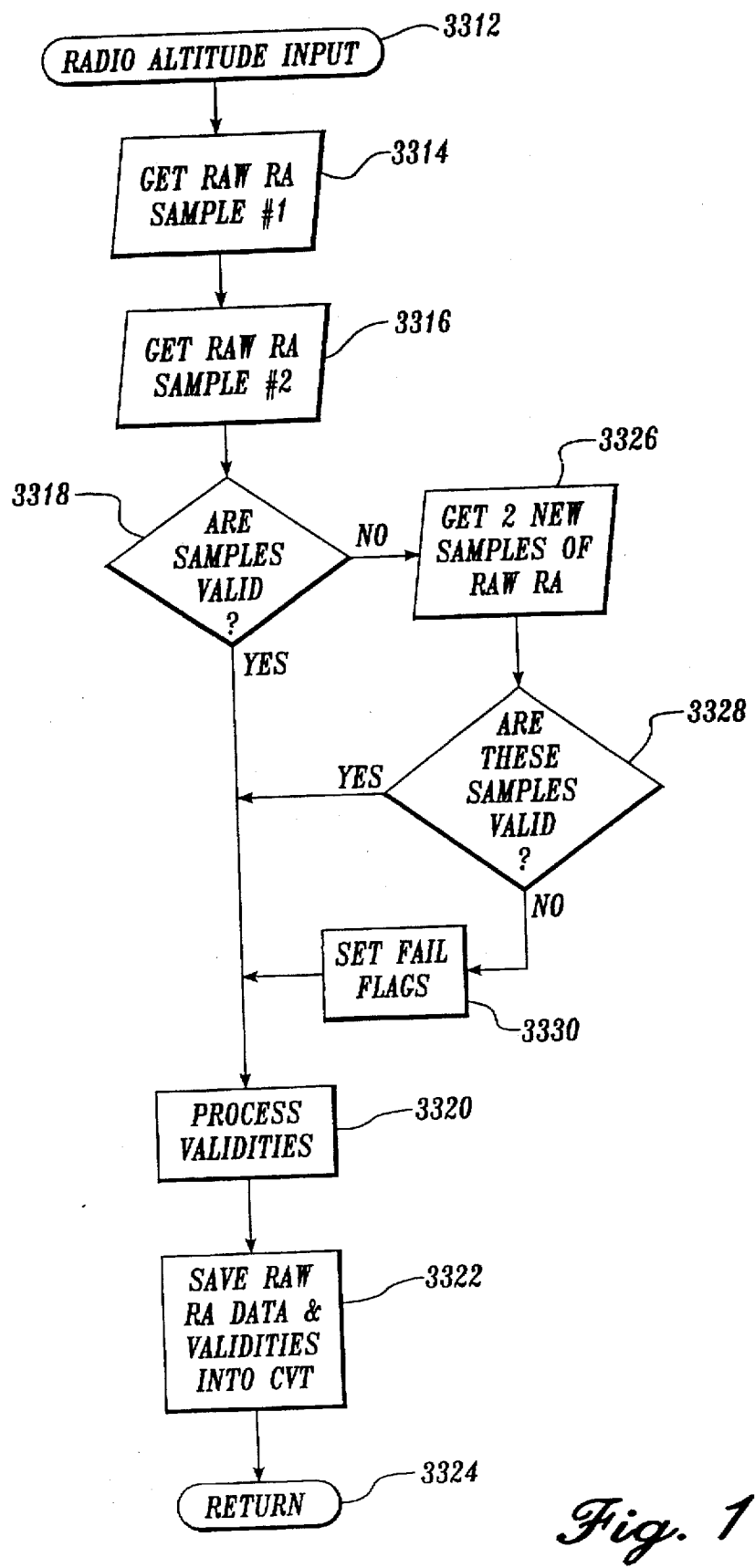
FIGS. 11 is a flow chart for the flight safety device according to one embodiment of the present invention.

Radio altitude data from the radio altimeter as converted to digital data are input to microprocessor 736 under the control of a RADIO ALTITUDE INPUT routine 3312, illustrated in FIG. 11. Initially, two data samples are obtained in steps 3314 and 3316. These radio altitude samples are obtained when the microprocessor 736 asserts signals read the high and low bytes of radio altitude data.

In step 3318 the system checks of the samples are valid. The validity of the radio altimeter signals are checked by checking the radio altimeter status signals that signify the availability of a positive and negative power supply of the required voltage to the radio altimeter system. A third signal is a tracking signal and, as mentioned above, is used to indicate when the radio altimeter subsystem is processing signals indicative of radio altitudes greater than 3,000 feet.

In step 3322 the high and low bytes of the radio altitude data are combined into a single value. During periods when the modulation frequency changes, the counter is disabled for about 1.024 milliseconds. In order to compensate for this condition, the radio altitude data signal is multiplied by about 1.257. Subsequently, the radio altitude data and validity samples are stored in step 3322; and the system returns in step 3324 to repeat the process.

Should it be determined in step 3318 that the two radio altitude samples gathered in steps 3314 and 3316 are invalid, an additional two samples are gathered in step 3326. The new samples are checked for validity in step 3328. If these samples are valid, they are processed in step 3320 as discussed above. If not, fail flags are set in step 3330 and the system returns to step 3320.

Figure 12:
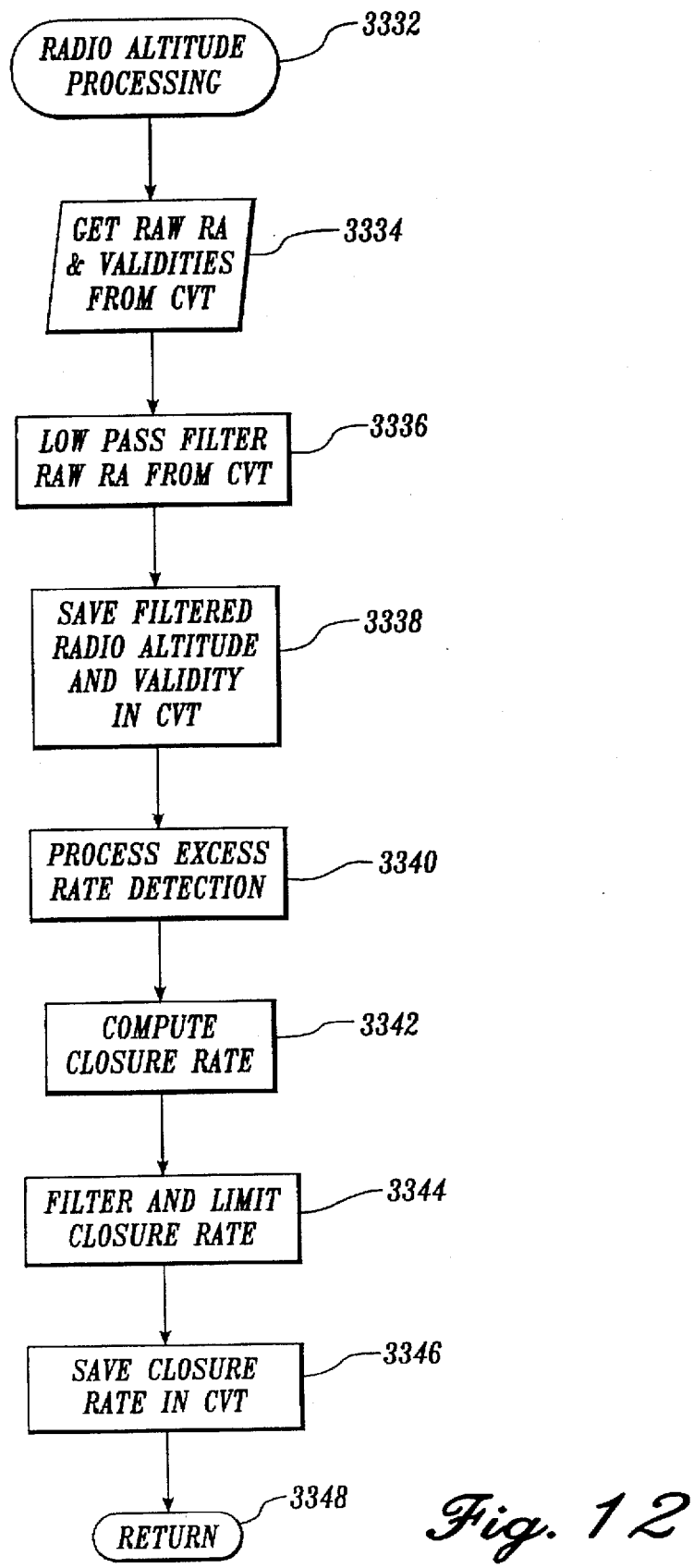
FIG. 12 is a flow chart for the flight safety device according to one embodiment of the present invention.

The radio altimeter data is processed by a radio altitude processing routine 3332 (FIG. 12). As will be discussed in more detail below, the radio altitude processing routine 3332 is used primarily to determine the closure rate based upon radio altitude data. As will be discussed in more detail below, the closure rate is utilized for the "CAUTION RISING TERRAIN" and "TERRAIN TERRAIN" call-outs.

In FIG. 12, the raw radio altitude and validity data discussed above is retrieved in step 3334. The raw radio altitude data is lowpass filtered in step 3336 and saved in step 3338 along with the validity data obtained in step 3334. The closure rate in feet per minute is computed in steps 3342 and 3344. The closure rate is provided in feet per minute and relates to the rate of change of radio altitude in feet as a function of time. The closure rate is filtered in step 3344 and saved in step 3346. The system returns in step 3348.

Figure 13:
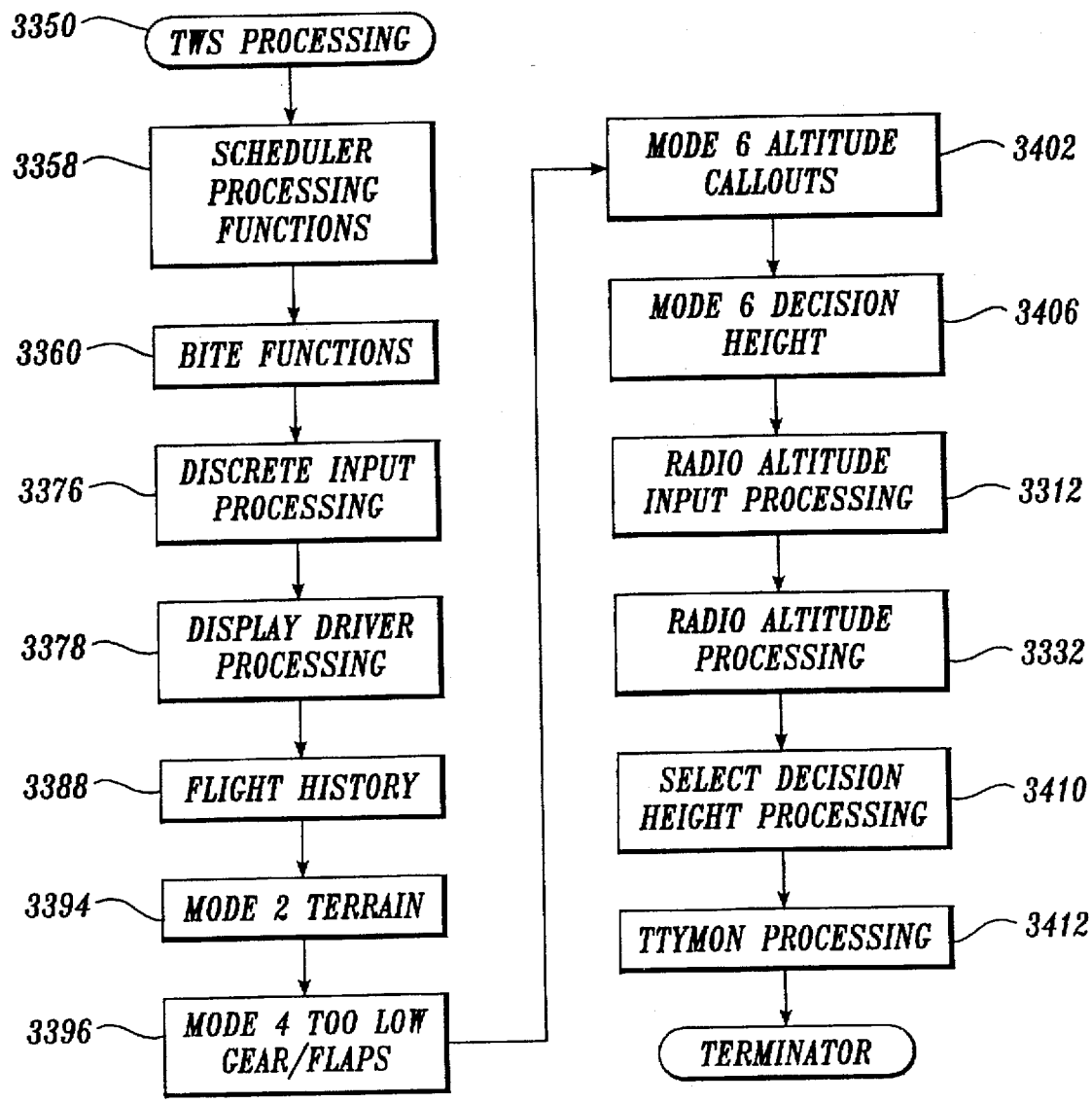
FIG. 13 is a flow chart for the flight safety device according to one embodiment of the present invention.

The algorithm for the terrain warning system process in 3350 is illustrated in FIG. 13. The TWS processing system 3350 is a main program that makes calls to the radio altitude input processing routine 3312, as well as the radio altitude processing routine 3332. The TWS processing routine 3350 is made up of a collection of independent software objects, illustrated in FIG. 14. A current value table 3370 keeps track of all inputs from the various objects.

Figure 14:
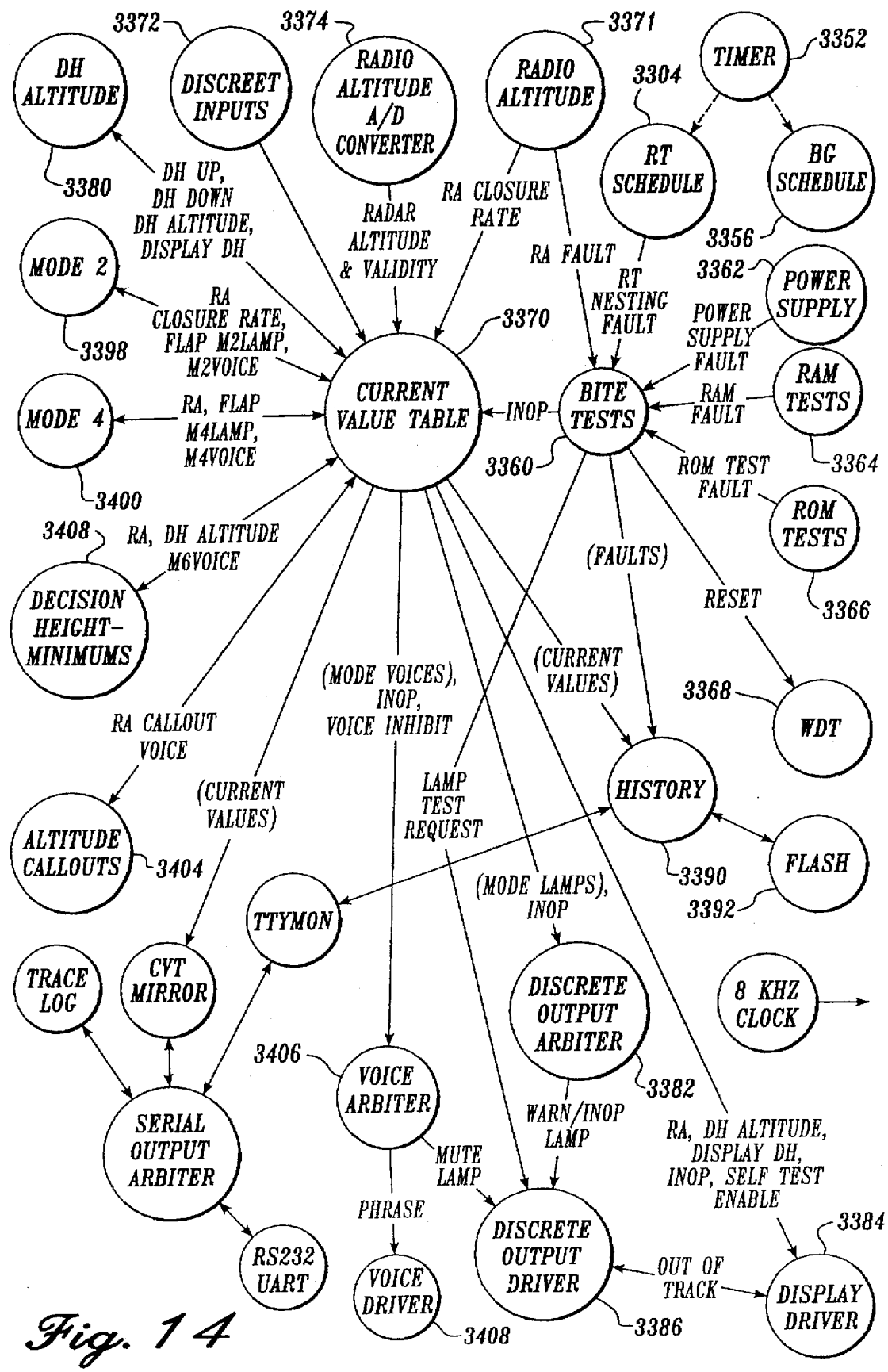
FIG. 14 is a software object diagram for the software control of the flight safety device of the present invention.

As shown in FIG. 14, the TWS processing system includes a timer 3352 that is used by a real-time task manager 3354 and a back-ground task (BG) manager 3356 for managing the tasks of all of the objects in the system. On power-up, the system does a number of start-up tests identified in FIG. 13 as BITE functions 3360. The start-up tests include checking the power supply 3362, checking the RAM 3364, the ROM 3366, as well as resetting the watch dog timer 3368. Should any of the power-up tests fail, an INOP flag is written to a current value table 3362.

In FIG. 14, the system 3350 also receives discrete inputs handled by a discrete input processing object 3376 from the radio altimeter subsystem as discussed above, as well as the flap and landing gear position. In addition, the system monitors the status of the system test switch 970, the audio inhibit switch 900, as well as the decision height up and down switches 910. The inputs to the system are separated into two categories: discrete inputs 3372; and radio altimeter subsystem have been discussed previously in connection with the radio altitude input processing routine 3312.

The discrete inputting processing 3376 is responsible for processing the flap and gear signals as well as the switch signals discussed above. In particular, the flap and gear input signals are under the control of a chip select signal driven by microprocessor 736. The inputs for the decision height switches 910, the audio inhibit switch 900, as well as the system test switch 970 are under the control of a control signal ZCSSWITCH also driven by microprocessor 736. The decision height switch 910 as well as the audio inhibit switch 900 and system test switch 970 are applied to connection 996 which, in turn, is applied to another octal latch. The output of this octal latch is applied to the data bus under the control of the switch chip select signal ZCSSWITCH. This signal allows microprocessor 736 to read the status of the switch inputs discussed above under the control of the real time task manager 3354. In addition to reading the status of the discrete and switch input signals, the discrete inputs object 3372, as part of the discrete input processing routine 3376 debounces all inputs and stores the values for all inputs in the current value table 3370.

In FIG. 13, the TWS processing 3350 also includes display driver processing routine 3378. The display driver processing routine 3378 includes various objects as illustrated in FIG. 14, including a decision height altitude object 3380, a discrete output arbiter 3382, a display driver 3384 and a discrete output driver 3386. In one embodiment of the invention display 737 is under the control of the control signals CSDISP1, CSDISP2 and CSDISP3. These signals are, in turn, driven by ports or the microprocessor 736. In particular, the control signal CISDISP2 controls the 1000 s and hundreds digits of display 737, while the control signal CSDISP3 controls the 10s and 1s digits of the display 737. Control signals CSDISP2 and CSDISP3 are used to drive the seven-segment decoders. The control signal CSDISP1 is used to control a latch used for various functions, including a lamp test.

During conditions when the radio altimeter system is out of track, the G segments of each of the characters are illuminated and the remainder is blanked such that all dashes are displayed to indicate to the pilot of the aircraft that the radio altimeter is out of track. In addition, anytime the system test switch 970 is depressed, and the radio altitude is at or below 30 feet, a lamp test and all the LED segments are illuminated which is initiated under the control of the control signal CSDISP1 as discussed above. If the radio altitude is above 30 feet, test switch 970 causes the TWS system to perform an internal test but does not change the displays.

The TWS system may be used to record certain data, such as radio altitude data, decision height set altitude, time ticks used to indicate the interval of time used to time tag the recorded events, the status test, audio inhibit status, flap input, gear input, status of the alert/warning call-out generation status, as well as the status of the self-test switch. Such data is adapted to be stored in the flash memory device 745. The recording of this data under the control of the flight history routine 3388 includes the history object 3390, which, as mentioned stores data in flash memory 745 under the control of a flash object 3392. Further details on the structure and operation of the flight history recorder are provided elsewhere in this specification.

As discussed in more detail below, the TWS system is adapted to provide various Mode 2 and Mode 4 warnings by the routines 3394 and 3396. These warnings are under the control of the Mode 2 and Mode 4 objects 3398 and 3400.

In addition to the Mode 2 and Mode 4 warnings, the system is adapted to provide Mode 6 altitude call-outs under the control of the routine 3402. The Mode 6 altitude call-outs are under the control of the altitude call-out object 3404, as well as the voice arbiter 3406 and voice driver 3408.

The audio subsystem is under the control of a control signal CSAUDIO, available via a port driven by microprocessor 736. As discussed above, the various warnings and call-outs and messages are stored in flash memory device 745. These stored digital voice recordings are sequenced out of flash memory device 745 under the control of the control signal CSAUDIO.

The TWS processing system 3350 also includes a Mode 6 decision height routine 3406, which compares current values of the radio altitude by way of a decision height minimum object 3408 and drives a voice driver 3408 to provide the call-outs at a pilot selected decision height.

Switch 910, previously described, enables the pilot of the aircraft to select the height at which the "MINIMUMS MINIMUMS" audio message is provided. Anytime either of the decision height switch 910 is depressed, it causes the display to momentarily blank and subsequently indicate the current setting of the decision height altitude. In one method for practicing the invention, the decision height altitude is slowly flashed on and off to distinguish it from radio altitude, for example at a flashing rate of twice per second with an on/off ratio of 70/30 percent. Within two seconds of placing the decision height switch 910, display 945 returns to displaying the radio altitude. Each time power is applied to the system, the decision height is automatically set to 000 feet, which, in turn, disables the decision call-out. Pressing and holding the decision and height switch 910 for at least two seconds causes the system to enter the decision height setting mode as discussed above. The display 745 will flash the current decision height altitude and will slowly start increasing or decreasing the displayed decision height altitude, depending on which switch is pressed. The decision height might be incremented or decremented at 50 foot intervals. When the desired decision height is reached, the pilot merely releases the switch. Each time the aircraft passes through the decision height altitude, a "MINIMUMS MINIMUMS" call-out is generated under the control of the voice arbiter 3406 and voice driver 3408. The TTWMON processing routine 3412 includes the objects TTYMON, CUTMIRROR, TRACELOG, SERIAL BUFFER ARBITER, and the RS232 UART from FIG. 14. The TTY-MON routine provides a test interface along with data download/upload capabilities to the CVT. During laboratory testing and debug TTYMON is used to verify that all switch objects inside the TWS are functioning correctly. In addition to lab testing TTYMON is used during flight testing to acquire system information to analyze TWS performance and improve the switch if it is needed. TTYMON also provides the interface to download flight history stored in flash ROM by object 3390.

The radio altitude input processing, as well as the radio altitude processing 3312 and 3332 have been discussed above. These routines are under the control of the objects 3371 and 3374.

Figure 15:
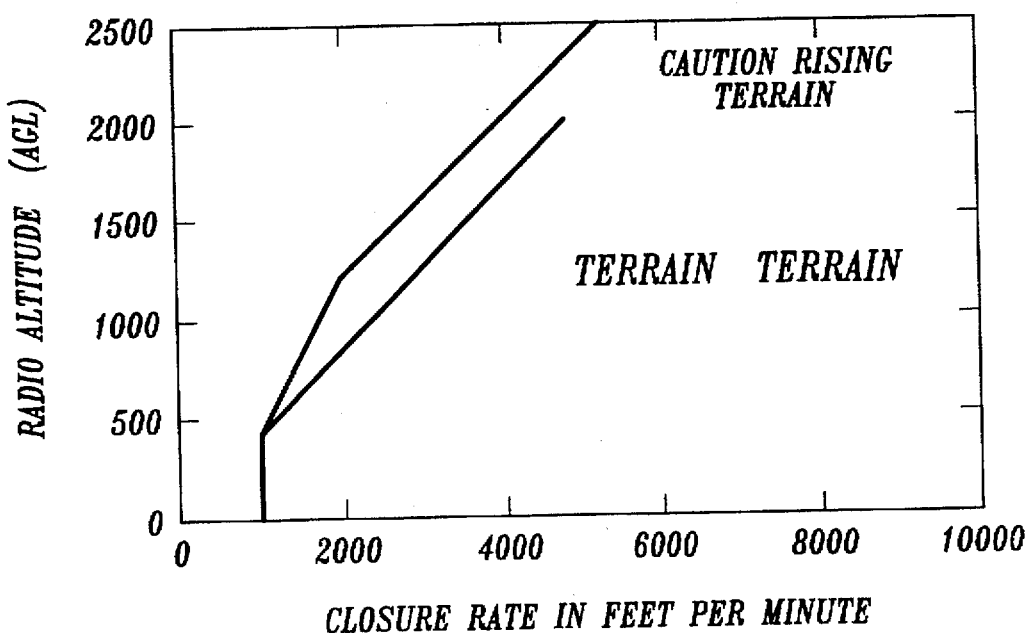
FIG. 15 is a graphical representation of the warning envelopes for the "CAUTION RISING TERRAIN", and "TERRAIN TERRAIN" warnings according to an embodiment of the present invention.

As mentioned above, the system provides various audio alerts and, in particular, a "CAUTION RISING TERRAIN". The "TERRAIN TERRAIN" audio warning is generated when the system detects terrain rising at rates generally illustrated in FIG. 15. In a preferred embodiment of the invention, the TWS system does not receive barometric rate data and is therefore unable to determine whether the closure rate computed is the result of rising terrain, loss of barometric altitude or a combination of both. As such, the warning envelope illustrated in FIG. 15 is selected to provide the aircraft with as much warning time as possible, while minimizing nuisance alerts. The audio messages are generated for each penetration into the envelope shown in FIG. 15. The rising terrain audio messages are generated at ten second intervals while the aircraft remains within the envelope. Exiting the alert envelope to the left or above will silence the alert. If the situation worsens and the aircraft exits the warning envelope either to the right or down, the audio message is replaced with a "TERRAIN TERRAIN" warning. Immediately upon the generation of the caution "RISING TERRAIN" audio message, the pilot is expected to verify correct aircraft altitude, attitude and geographic location. Selecting full flaps will eliminate the audio message.

The warning envelope generally indicates closure rates of 1000 feet per minute or greater at altitudes of 500 feet or less. The warning envelope is anticipated to provide about 25 seconds of warning time to the pilot. In addition to the "TERRAIN TERRAIN" audio message, the altitude call-outs will also be generated as the aircraft passes through those altitudes. The altitude call-outs have priority over the terrain warning. These call-outs are provided once for each descent through the specific altitude, if their associated enabling altitudes have been reached. Arbitration between the various audio messages is accomplished by the voice arbiter 3406. If the aircraft moves from the "CAUTION RISING TERRAIN" envelope to the "TERRAIN TERRAIN" envelope, the "CAUTION RISING TERRAIN" audio message will be terminated while the "TERRAIN TERRAIN" audio messages will start.

The system also provides a "TOO LOW FLAPS" call-out. The aircraft descends, for example, below 170 feet of radio altitude without full flaps selected. This call-out is generated for each descent and will not be enabled again until the aircraft has climbed above 500 feet of radio altitude.

The system also provides a "TOO LOW GEAR" call-out for aircraft equipped with retractable gear. If the aircraft descends, for example, below 450 feet of radio altitude without the gear extended, this voice message is enunciated to the pilot. The message issues only if enabled, e.g., after the aircraft has climbed above 800 feet of radio altitude.

AIRCRAFT FLIGHT HISTORY FUNCTION

As briefly described above, the flight safety device of the present invention may be used to record certain flight data thereby preserving a record of the flight. This type of data and the safety benefits it provides has heretofore been unavailable to the pilot/operator of general aviation aircraft. Specifically, this data proves useful in accident reconstruction and investigation, and the monitoring of student pilots during solo flights. Furthermore, the flight history data may also yield improvements in the alert functions of the present invention by providing information on the performance of the warning envelopes and the occurrence of nuisance warnings. In the absence of this recorded information, improvements can only come through the subjective and happenstance medium of direct pilot feedback.

Figure 16:
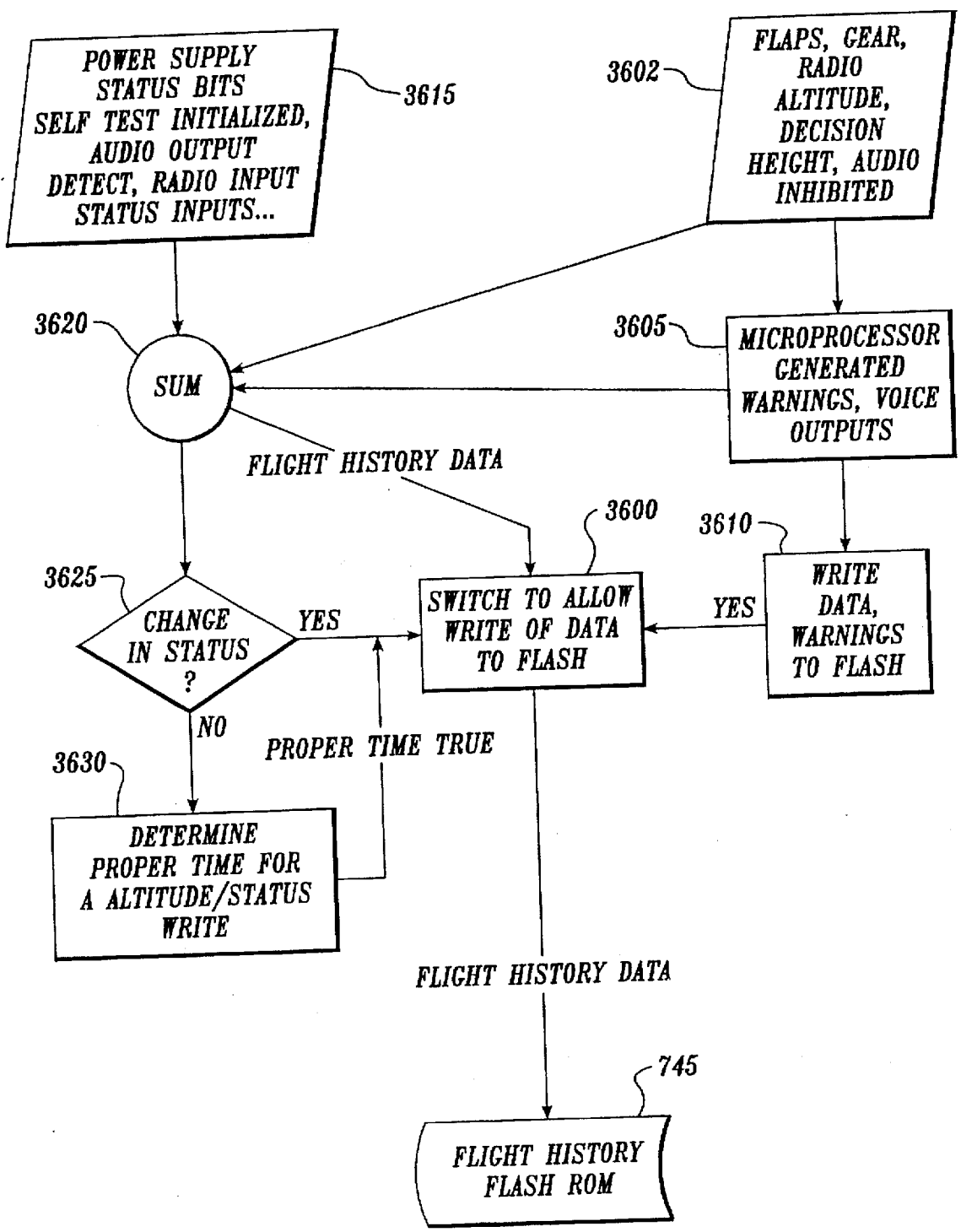
FIG. 16 is a flow chart of the flight history process according to an embodiment of the present invention.

FIG. 16 contains a flow chart describing operation of the flight history function according to an embodiment of the present invention. The writing of flight history data to flash ROM 745 is controlled through activation of a switch 3600. Activation of switch 3600 is governed by the generation of an alert or warning, detection of a change in aircraft status, and/or at predetermined time intervals.

In step 3602 of FIG. 16, the device reads the status of the external inputs. These inputs may include, but are not limited to: flaps, gear, altitude signal, audio inhibit, and decision height selected. The status inputs of step 3602 are used by the flight safety system to generate warnings, alerts and altitude call-outs in step 3605 according to the procedures described in the previous section. According to a preferred embodiment of the invention, the flight history device includes a provision to enable switch 3600 whenever a microprocessor 736 outputs a warning or alert. The switch enable is depicted in step 3610 of FIG. 16. Activation of switch 3600 by step 3610 causes the warning or alert data device status to safety device status to be written to flash ROM 745. Flight safety device status data may include: self test initialized by the crew, audio output detected, radio altitude status bits, power supply input power status and power supply supply output voltages. The system status data may be present within the system as a discrete variable, a status bit, the output of a latch or according to any number of techniques commonly known to those of skill in the art.

Operation of switch 3600 may also be triggered by detecting a change in the aircraft or system status. Process 3615 represents the status inputs described in the previous paragraph. In step 3620, the outputs of processes 3602, 3605 and 3615 are summed. A change in sum indicates a change in either the aircraft or system status 3625, enabling switch 3600 and causing the system status data and flight data to be written to memory 745.

In the case of radio altitude data, a change in status is determined by detecting a change of predetermined magnitude from the previous value. The predetermined magnitude can be a variable range depending upon the height above ground level. The variable range results in fewer updates to the flight history when the aircraft is flying at higher altitudes and more frequent updates when the aircraft is flying at lower altitudes. Additionally, the variable range permits the update rate to vary according to the type of aircraft on which the device is installed.

In the absence of change of status or warning data to trigger switch 3600, various other conditions as represented by block 3630 may be established to enable operation of switch 3600. These conditions may, for example include:

(a) flight at a predetermined altitude above ground;
(b) type of aircraft;
(c) aircraft mission;
(d) time since last update; and/or
(e) warnings recently issued. Other criteria for enabling switch 3600 may be used.

In the preferred embodiment of the invention, the flight history memory 745 comprises a 2 Meg boot block type flash ROM, Model No. TE28F200BX-T80 manufactured by Intel. Alternatively, a 4 Meg version of this memory device may be used. Sector erase flash memories can also be used but tend to have higher densities and associated costs. Past technologies of EPROM and EEPROM have the desired nonvolitility but posses certain undesirable characteristics for use in the present invention. EPROMS cannot be reprogrammed within the system. EEPROMS lack the desired density and are too slow to be used in the present device. Furthermore, both EPROMS and EEPROMS do not posses the same facility for rewriting and erasing as does the boot block type flash ROM.

The boot block flash ROM is subdivided into blocks of variable length by the manufacturer. The variable block size proves advantageous over the more regularly subdivided sector erase or bulk erase type memories. Specifically, the boot block flash ROM include the feature of a lockable "boot" sector for storing program code. The boot sector requires execution of additional steps to reprogram and is not easily overwritten. The lockable boot sector can be used by the present invention to enable processor 736 to be run out of this block while the system code/voice memory ROM is reprogrammed in the field via the RS232 connection.

The remaining blocks of ROM 745 are employed by the present invention as follows. As data is written to the ROM, the end of one of these blocks is reached. The microprocessor is able to skip to the next available block and begin writing at that location. As clear blocks are used, microprocessor 736 initiates an erase of the oldest memory block. The erase does not effect the remaining blocks.

In general, the last five minutes of the flight are retained in memory, however any interval may also be used including continuous recordation. In addition, recording of data can be stopped when the radio altitude is below 30 feet or above 3,000 feet. Each of the status entries are time tagged. The time ticks are reset at power-up and are sequential until power-down.

Data from several flights fit into a single block. This storage capacity possesses unique advantages over prior art flight recorders. In particular, the extended flight history would prove of value to flight instructors evaluating student solo performance. The extended flight history also provides additional information to accident investigators. Alternatively, the data from several flights may be used to show trend information on a particular pilot or aircraft.

According to one additional aspect of the present invention, device 2 may be automatically configured during installation. "Auto configurable" flap, gear and audio volume select inputs read in any flap or gear input voltages and store the flap and gear up and down positions in the flight history FLASH 745.

In "manual" flap and gear input methods a separate input for each variation of input expected exists. For example, one aircraft may have an input with flaps up=28V and flaps down=0V. Another aircraft may have flaps up=0V and flaps down=12V, and yet another could have flaps up grounded and flaps down open. Each of these type of inputs requires separate input pins or some type of configurable input using "program pins". Audio volume select has also been done with program pins in the past.

The manual configuration has been a problem in past designs because as new aircraft types were added to the list of installable aircraft, software and hardware changes were usually required. There are potentially an infinite number of variations of input ranges given the number, types and age of the target aircraft for TWS. In the autoconfigure mode, the TWS has only one flap input and one gear input and no program pins.

The elimination of program pins is accomplished using an A/D converter, software, Flash EPROM, and the device front panel displays and switches. The A/D converter reads in whatever voltage is present at the flap or gear inputs. The device installer will be prompted to place the flaps/gear up and down and the TWS device will store the up and down position readings in one of the Flight History 745 flash segments. If the aircraft has no flaps or gear that information will be stored as well. The Audio volume will be set for a particular aircraft in much the same way; the installer will be prompted to select an appropriate volume while the TWS device outputs a test message.

The front panel displays and switches will be used for implementing a menu system for installation configuration and test. For example, the decision height up and down 910 can be used to adjust the audio volume up and down, the altitude display can display the current input voltage, and the decision height display can be used for operator prompts.

Preferred embodiments of the invention have been described. Variations and modifications will be readily apparent to those of skill in the art. For this reason the invention is to be interpreted in light of the claims.

What is claimed is:

1. A radio altimeter comprising:
   a predetermined oscillator for generating an oscillation signal at a predetermined frequency;
   means for modulating said oscillation signal with a predetermined modulation signal defining a modulated signal;
   means for radiating said modulated signal defining a radiated modulated signal;
   first means for coupling said modulated signal to said radiating means, said first coupling means including one or more radiating circuit microstrips;
   means for amplifying said modulation signal, said amplifying means having a predetermined gain selected to eliminate the need to tune said one or more radiating circuit microstrips;
   means for receiving a reflection of said radiated modulated signal defining reflection signals;
   means for mixing said modulated signals with said reflection signals to generate an audio signal whose frequency is proportional to the altitude of the aircraft above ground;
   second means for coupling said reflection signals to said mixing means, said second coupling means including one or more receiving circuit microstrips; and
   means for amplifying said reflection signals, said amplifying means including a plurality of low-noise amplifiers, at least one of said low-noise amplifiers having a predetermined gain selected to eliminate the need to tune said one or more receiving circuit microstrips.

2. A radio altimeter as recited in claim 1, wherein said predetermined oscillator is a voltage controlled oscillator.

3. A radio altimeter as recited in claim 2, wherein said voltage-controlled oscillator includes a GaAs field-effect transistor (FET).

4. A radio altimeter as recited in claim 1, wherein said predetermined modulation signal is a triangular wave having a predetermined modulation frequency.

5. A radio altimeter as recited in claim 4, further including means for enabling manual selection of said modulation frequency from a plurality of modulation frequencies.

6. A radio altimeter as recited in claim 1, wherein said modulation signal amplifying means includes a predetermined buffer amplifier.

7. A radio altimeter as recited in claim 6, wherein said modulation signal amplifying means includes a power amplifier coupled to said buffer amplifier by way of said coupling means.

8. A radio altimeter as recited in claim 6, further including means for adjusting the operating set point of said buffer amplifier.

9. A radio altimeter as recited in claim 7, further including means for adjusting the set point of said power amplifier.

10. A radio altimeter as recited in claim 1, further including means for amplifying said reflection signals.

11. A radio altimeter as recited in claim 10, wherein said reflection signal amplifying means includes a low-noise amplifier (LNA) coupled to said mixing means and coupling means for coupling said LNA to said mixing means, said coupling means including one or more microstrips.

12. A radio altimeter as recited in claim 1, further including means for providing a signal representative of the gain of said modulation signals.

13. A radio altimeter comprising:
    an oscillator for generating an oscillation signal at a predetermined frequency;
    a modulator for generating a modulation signal for modulating said oscillation signal, said modulation signal being a triangular wave at a predetermined modulation frequency, defining a modulated signal;
    a buffer amplifier having a predetermined gain for amplifying said modulated signal, said buffer amplifier being electrically coupled to said oscillator, said coupling including one or more microstrips;
    a power amplifier having a predetermined gain, electrically coupled to said power amplifier, said coupling including one or more microstrips;
    an RF output terminal electrically coupled to said power amplifier, said coupling including one or more microstrips;
    an RF input terminal for receiving reflected signals;
    a mixer for mixing said modulated signals with said reflected signals to generate a signal whose frequency is proportional to the altitude of the aircraft above ground;
    a local oscillator coupling device which includes one or more microstrips for coupling said modulated signal to said mixer; and
    a plurality of low-noise amplifiers, each of said amplifiers having a predetermined gain, said amplifiers electrically coupled to said RF input terminal and to said mixer by microstrips, wherein the gain of at least one of said amplifiers is selected to eliminate the need to tune said microstrips.

14. A radio altimeter as recited in claim 13, further including means for adjusting the operating point of said buffer amplifier.

15. A radio altimeter as recited in claim 13, further including means for adjusting the operating point of said power amplifier.

16. A radio altimeter as recited in claim 13, further including means for adjusting the operating point of at least one of said low-noise amplifiers.

17. A radio altimeter as recited in claim 13, wherein said circuit for generating said modulation circuit includes a counter for generating a square wave having a predetermined modulation frequency and means for integrating said square wave to generate a triangular wave modulation signal.

18. A radio altimeter as recited in claim 17, further including means for disabling said modulation signal for predetermined frequencies.

19. A radio altimeter as recited in claim 13, further including means for detecting the output level of said modulated signal and comparing it with a reference signal to generate a status signal representative of the level of the output signal.

20. A radio altimeter as recited in claim 13, wherein said radio altimeter is formed on a glass/epoxy circuit board.

21. A frequency modulated continuous wave radio altimeter comprising:

(a) a transmit circuit for transmitting a first signal;

(b) a receive circuit for receiving a reflection of said first signal and for producing a second signal indicative of a height above ground; and (c) at least one of said transmit circuit or said receive circuit including:
 (i) at least one microstrip circuit; and
 (ii) a plurality of amplifiers electrically coupled to said microstrip circuit, said amplifiers having a gain selected to eliminate the need to tune said microstrip circuit.

22. The altimeter of claim 21 wherein said altimeter is fabricated on a glass/epoxy printed circuit board.

23. The altimeter of claim 21 wherein said amplifiers further include GaAs field effect transistors as active elements.

* * * * *